United States Patent [19]
Faigon et al.

[11] Patent Number: 6,006,016
[45] Date of Patent: Dec. 21, 1999

[54] NETWORK FAULT CORRELATION

[75] Inventors: Anat Faigon; Girish Kotmire; Ilan Raab, all of Sunnyvale; Robert Magnus Romero, Mountain View, all of Calif.

[73] Assignee: Bay Networks, Inc., Santa Clara, Calif.

[21] Appl. No.: 08/730,893

[22] Filed: Oct. 18, 1996

Related U.S. Application Data

[63] Continuation of application No. 08/626,647, Apr. 1, 1996, abandoned, which is a continuation of application No. 08/337,085, Nov. 10, 1994, abandoned.

[51] Int. Cl.⁶ .................................................. G06F 11/00
[52] U.S. Cl. .............................. 395/185.01; 395/185.09; 395/183.15; 395/183.02
[58] Field of Search ........................ 395/185.08, 185.1, 395/185.09; 371/5.1

[56] References Cited

U.S. PATENT DOCUMENTS

| | | | |
|---|---|---|---|
| 4,409,662 | 10/1983 | Rao ............................................ | 364/557 |
| 4,881,230 | 11/1989 | Clark et al. ............................... | 371/20.1 |
| 4,972,453 | 11/1990 | Daniel, III et al. ........................ | 379/10 |
| 4,985,857 | 1/1991 | Bajpai et al. .......................... | 364/551.01 |
| 5,210,704 | 5/1993 | Husseiny .............................. | 364/551.01 |
| 5,214,653 | 5/1993 | Elliott, Jr. et al. ...................... | 371/15.1 |
| 5,223,827 | 6/1993 | Bell et al. ............................ | 340/825.06 |
| 5,394,543 | 2/1995 | Hill et al. ................................. | 395/575 |
| 5,483,637 | 1/1996 | Winokur ............................. | 395/183.02 |
| 5,491,687 | 2/1996 | Christensen et al. ............... | 395/182.02 |
| 5,513,185 | 4/1996 | Schmidt .................................... | 371/5.5 |
| 5,539,877 | 7/1996 | Winokur et al. .................... | 395/183.02 |
| 5,568,491 | 10/1996 | Beal et al. ......................... | 395/182.02 |
| 5,652,714 | 7/1997 | Peterson et al. ........................ | 364/550 |

OTHER PUBLICATIONS

Doyle, "Computer Dictionary", 1994, pp. 268–269, 2nd Edtion.

Microsoft Press, "Computer Dictionary 2nd edition", pp. 220–221, 1994.

*Primary Examiner*—Robert W. Beausoliel, Jr.
*Assistant Examiner*—Scott T. Baderman
*Attorney, Agent, or Firm*—Blakely, Sokoloff, Taylor & Zafman LLP

[57] ABSTRACT

A method and apparatus for correlating faults in a networking system. A database of fault rules is maintained along with and associated probable causes, and possible solutions for determining the occurrence of faults defined by the fault rules. The fault rules include a fault identifier, an occurrence threshold specifying a minimum number of occurrences of fault events in the networking system in order to identify the fault, and a time threshold in which the occurrences of the fault events must occur in order to correlate the fault. Occurrences of fault events in the networking system are detected and correlated by determining matched fault rules which match the fault events and generating a fault report upon determining that a number of occurrences for the matched fault rules within the time threshold is greater than or equal to the occurrence threshold for the matched fault rules.

19 Claims, 25 Drawing Sheets

TRAP OBJECT

RAW TRAP RECORD

FAULT RULE

| # | Field |
|---|---|
| 1001 → | RULE NAME |
| 1002 → | RULE NUMBER |
| 1003 → | PROBLEM TYPE |
| 1004 → | PROBLEM DESCRIPTION |
| 1005 → | SEVERITY |
| 1006 → | EVENT THRESHOLD |
| 1007 → | TIME INTERVAL |
| 1008 → | AGE TIME |
| 1009 → | ESCALATION THRESHOLD |
| 1010 → | RULE ACTIVE ? |
| 1011 → | PROBLEM CAUSE |
| 1012 → | PROBLEM SOLUTION |

META TRAP OBJECT

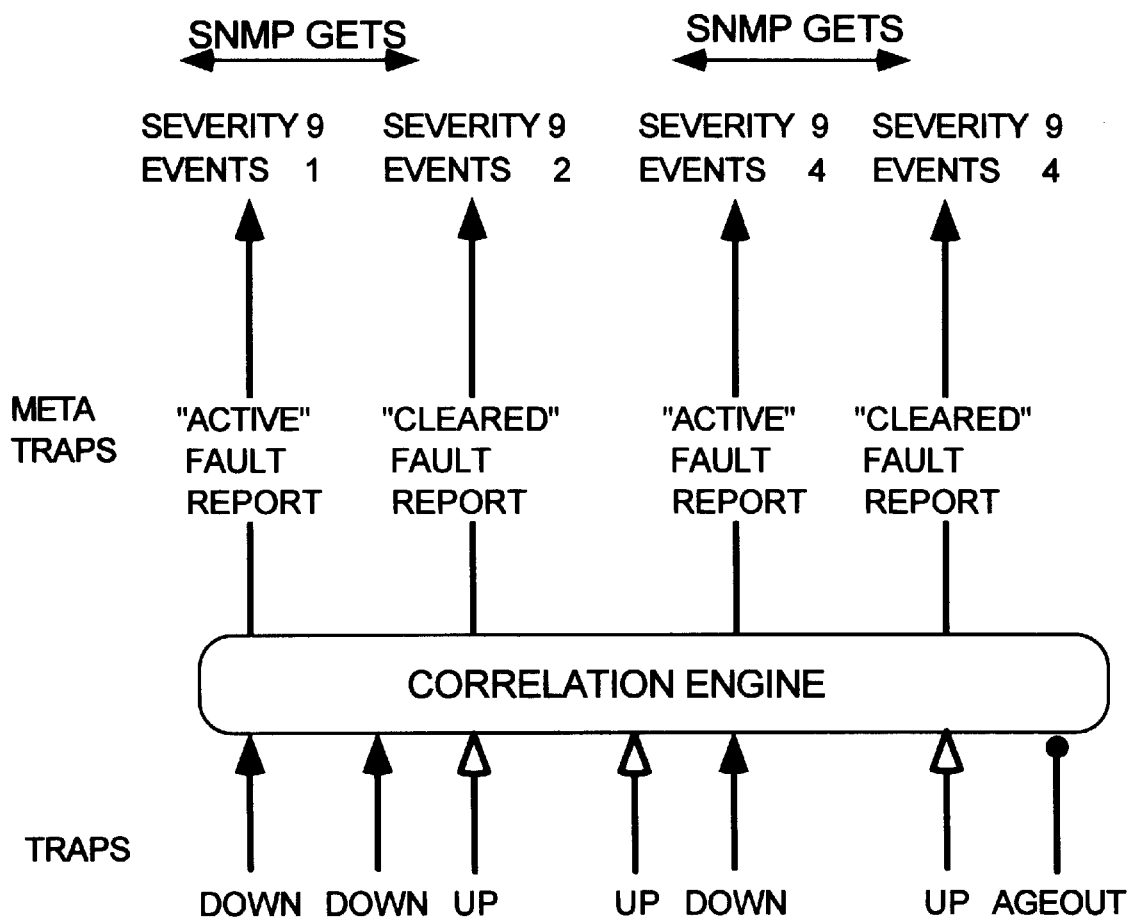
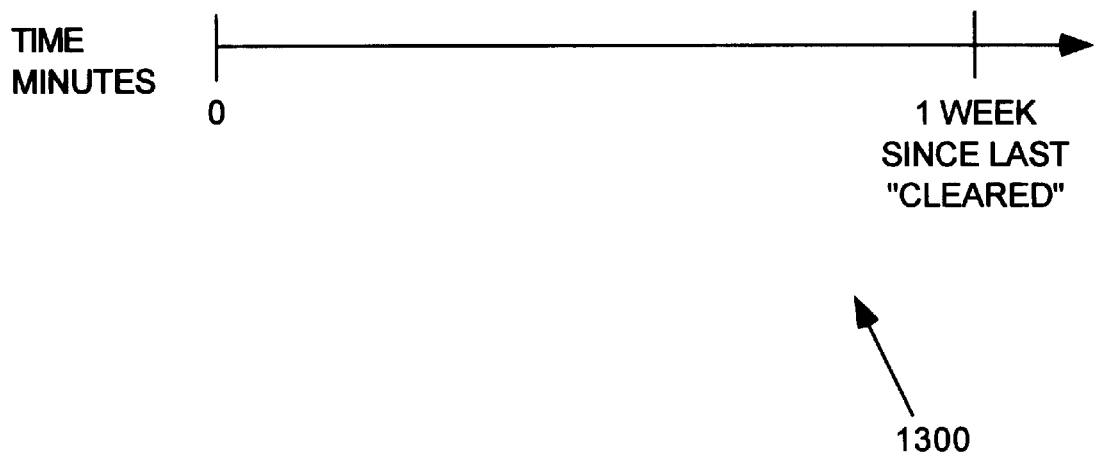
FIG.13

STATE RULE

1701 → RULE NUMBER
1702 → STATE CATEGORY
1703 → SEVERITY LEVEL
1704 → UPDATE MODE
1705 → MAXIMUM LIMIT
1706 → AGING INTERVAL

Fault Correlator: Fault Detail

| | | | |
|---|---|---|---|
| Severity: | 7 | Create Date: | Jan 11 16:04:58 1994 |
| Problem Type: | TR Bridge Lost | Correlator IP: | 134.177.120.128 |
| Device: | 134.177.224.40 | Vendor: | SynOptics |
| Host Name: | pluto | Traps: | 451938 |

Description:

Token ring board 4, port 12 wrapped or unwrapped. Status is 4. (unwrapped (3), wrapped (2), timed wrap (4), beacon Probable Cause:

Element has been wrapped by NMM because it was beaconing

Proposed Solution:

Locate the beaconing station and check its adapter configuration

Assignee: [         ]   Status: [ New ▫ ]

Comments: [         ]

[ Close ]  [ Apply ]  [ Print ]  [ Delete ]

FIG. 21

NETWORK FAULT CORRELATION

This is a continuation of application No. 08/626,647, filed Apr. 1, 1996, now abandoned, which is a continuation of application No. 08/337,085, filed Nov. 10, 1994, now abandoned.

BACKGROUND OF THE INVENTION

1. Field of the Invention

The present invention relates to networking systems. More specifically, the present invention relates to a correlation method and apparatus for correlating network faults over time in order to perform network fault management in a networking system, and monitor the health of devices in the network.

2. Background Information

As networking systems proliferate, and the problems involved in configuring and maintaining such networks also increase, network management becomes an increasingly complex and time-consuming task. One of the primary considerations in managing networks, especially as their size increases, is fault management. Very simple types of fault management may be performed by determining when communication links and devices in the system fail, then, some sort of corrective and/or diagnostic measures may be taken such as manual connection and reconnection of physical links, and testing and diagnosis of network devices and/or end stations.

More sophisticated techniques for fault detection and diagnosis include receiving traps or other types of alert signals from devices within the network. As faults are detected, devices can alert a centralized device such as a computer system or other networking system management console, that such faults have occurred. These prior art techniques have suffered from some shortcomings, however. First, typical prior art fault detection and diagnostic systems include centralized consoles which receive and record fault alert signals or traps as they occur. Management tools which provide such diagnostic capability frequently rate faults received from units in the networking system according to their severity. Unless a certain number of traps are received of a particular type, according to predefined rules, then no action is taken upon the traps.

A fundamental problem with these pre-existing systems is that because functionality is concentrated in a single device in the network, networks errors at various devices in the network may not be able to be detected. Moreover, these errors may occur in such a volume that actual network errors may be obscured. In fact, some errors may be lost due to the large volume of faults at the single device. Because a large amount of faults may be generated which do not indicate any specific problems in the network (e.g., transient faults), errors indicating actual severe faults actually requiring action may go unnoticed.

Yet another shortcoming of certain prior art systems includes the ability to determine whether the detected faults are indicative of a one specific problem identified by the fault type, rather than a symptom of a different problem. Multiple faults of a specified fault type may need to be detected in order for a one particular problem type to be identified. Thus, individual faults which are detected are simply "raw" error data and don't necessarily indicate an actual problem. These may, given certain circumstances, indicate a specific problem, and current art fails to adequately address the correlate multiple faults over time intervals to identify specific problems.

Another fundamental shortcoming of prior art network diagnostic techniques is that such prior art techniques typically rely upon a single count of a number of errors of a particular type occurring. This technique, known as "filtering", has fundamental shortcomings in that it does not provide for other types of measurement of faults such as time such faults are occurring, number of faults within a given time period, or other more sophisticated approaches. Moreover, some prior art diagnostic systems only provide records of faults, but do not, based upon other measured fault characteristics, attempt to determine a possible reason for a fault or group of faults, and moreover, do not offer any practical solutions to a network manager or other user.

Other prior art solutions to network fault management include displaying the status of network devices in a manner which allows, at a glance, to determine whether a given device is functioning or not. These solutions include displaying color-coded iconic representations of devices on a computer console based upon single polls or "pings" of devices in the networking system. This solution fails to take into account intermittent failures of links and/or devices which may only occur a single time, the time of the poll, or sporadically, and which do not necessarily pose any substantial threat to normal network operation. Other prior art solutions show network health in this manner using user-defined state machines which are used by the management console. Both of these solutions usually rely upon simple displays of representations of individual devices in the network rather than displays at various levels of abstraction in the system, including, the port, slot, chassis and device level. In addition, none of these prior art solutions use network topology information in order to determine how network health changes for related devices causes corresponding changes in each of the related devices' health.

Thus, the prior art of network fault detection and network health monitoring has several shortcomings.

SUMMARY AND OBJECTS OF THE PRESENT INVENTION

One of the objects of the present invention is to provide a network fault diagnostic system which does not rely upon a single device for detecting faults.

Another of the objects of the present invention is to provide a diagnostic system in a networking which uses a number of variables for determining whether faults of a certain type have occurred in the system.

Yet another of the objects of the present invention is to provide a system which, when given certain criteria, provides probable causes and possible solutions for such faults in a networking system.

These and other objects of the present invention are provided for by a computer-implemented method for correlating faults in a networking system. The method establishes a database of fault rules, and associated probable causes, and possible solutions for determining the occurrence of faults defined by the fault rules. The fault rules include a fault identifier, a description of the fault, a possible cause for the fault, a probable solution for the fault, an occurrence threshold specifying a minimum number of occurrences of fault events in the networking system in order to identify the fault, a time threshold in which the occurrences of the fault events must occur in order to correlate the fault, and a severity value indicating the severity of the fault. Occurrences of fault events in the networking system are detected and correlated by determining matched fault rules which match the fault events and generating a fault report upon determining that a number of occurrences for the matched fault rules within the time threshold is greater than or equal to the occurrence threshold for the matched fault rules. The descriptions, the probable causes, the possible solutions and the severity value for each of the fault reports may then be displayed for diagnosis of the faults in the networking system.

The correlating of the occurrences of the fault events may be performed by a plurality of distributed network devices each responsible for correlating fault events generated by a subset of devices in the networking system. A management device may then record the fault reports generated by each of the plurality of distributed network devices, and present the descriptions, the probable causes, the possible solutions and the severity value for each of the fault reports. In this way, the load of correlating faults is distributed, and an efficient level of abstraction for examining the traps in the network may be maintained.

In implemented embodiments, fault rules further may include an escalation threshold and escalation reports are generated upon determining that a previous fault report has been generated for each of the matched fault rules, then determining whether the number of fault event occurrences since the time threshold is greater than or equal to the escalation threshold. Certain of the fault rules may also be designated as toggle rules which are associated with at least two types of fault events. In this instance, the step of correlating the occurrences of the fault events further comprises generating a toggle fault report if the fault events are either of the at least two types of faults and current states of devices to which the fault events pertain are different than states indicated by previous fault reports. A set of state rules for the devices in the networking system may also be established wherein the fault correlators determine which state rules match the fault events, and issue state change reports in order to record states of the devices in the networking system. State changes are determined based upon the interrelationship of network objects, as determined using stored network topology information. By means of state change operators (e.g. "increment" and "set") and associated severity values, network object operation may be monitored and displayed. These state changes may also be propagated to other objects which include the affected objects.

These and other objects of the present invention are provided for by a fault correlation apparatus for use in a networking system which includes a plurality of fault correlators for coupling to the networking system, wherein each of the plurality of fault correlators is responsible for correlating fault events from a subset of devices in the networking system. Each of the plurality of fault correlators includes a plurality of fault correlation rules each including a rule identifier, a time threshold, and a number of occurrences, a criteria matcher for determining whether the number of occurrences of fault events having identifiers equal to the rule identifier has occurred within the time threshold for each of the plurality of fault rules, and a fault report generator for generating fault reports upon activation of the criteria matcher. A fault recorder is coupled to the fault correlators for recording the fault reports and a fault monitor is coupled to the fault recorder for displaying the fault reports associated with possible causes and/or solutions for faults represented by the fault reports. The fault recorder and the fault monitor comprise a network management station for use by a network manager.

Other objects, features and advantages of the present invention will be apparent from the accompanying description and figures which follow below.

BRIEF DESCRIPTION OF THE DRAWINGS

The present invention is illustrated by way of example and not limitation in the figures of the accompanying in which like references indicate like elements and in which:

FIG. 10 shows the structure of a fault correlation rule in implemented embodiments.

FIG. 13 illustrates the operation of a fault correlation toggle rule.

FIG. 17 illustrates the representation of a record for a state rule.

FIG. 21 illustrates a user interface for displaying the data associated with a particular fault, and a probable cause and/or a possible solution for the fault.

DETAILED DESCRIPTION

The present invention is related to a correlation system and method for use within a networking system. Traps and solicited responses are correlated over time for determining faults in the networking system in order to determine probable faults, causes, and possible solutions to those faults in the networking system. This system may be distributed among a number of correlators in a networking system, making it especially useful for very large networking systems which require fault correlation at different levels of abstraction, and which generate a high amount of fault event traffic in some instances, actually indicating the presence of faults in the network. Although the present invention will be described with reference to certain specific embodiments, including specific data structures, types of communication media, networking systems, etc., it can be appreciated by one skilled in the art that these are for illustrative purposes only and are not to be construed as limiting the present invention. Other departures, modifications, and other changes may be made, by one skilled in the art, without departing from the teaching of the present invention.

Figure 1:
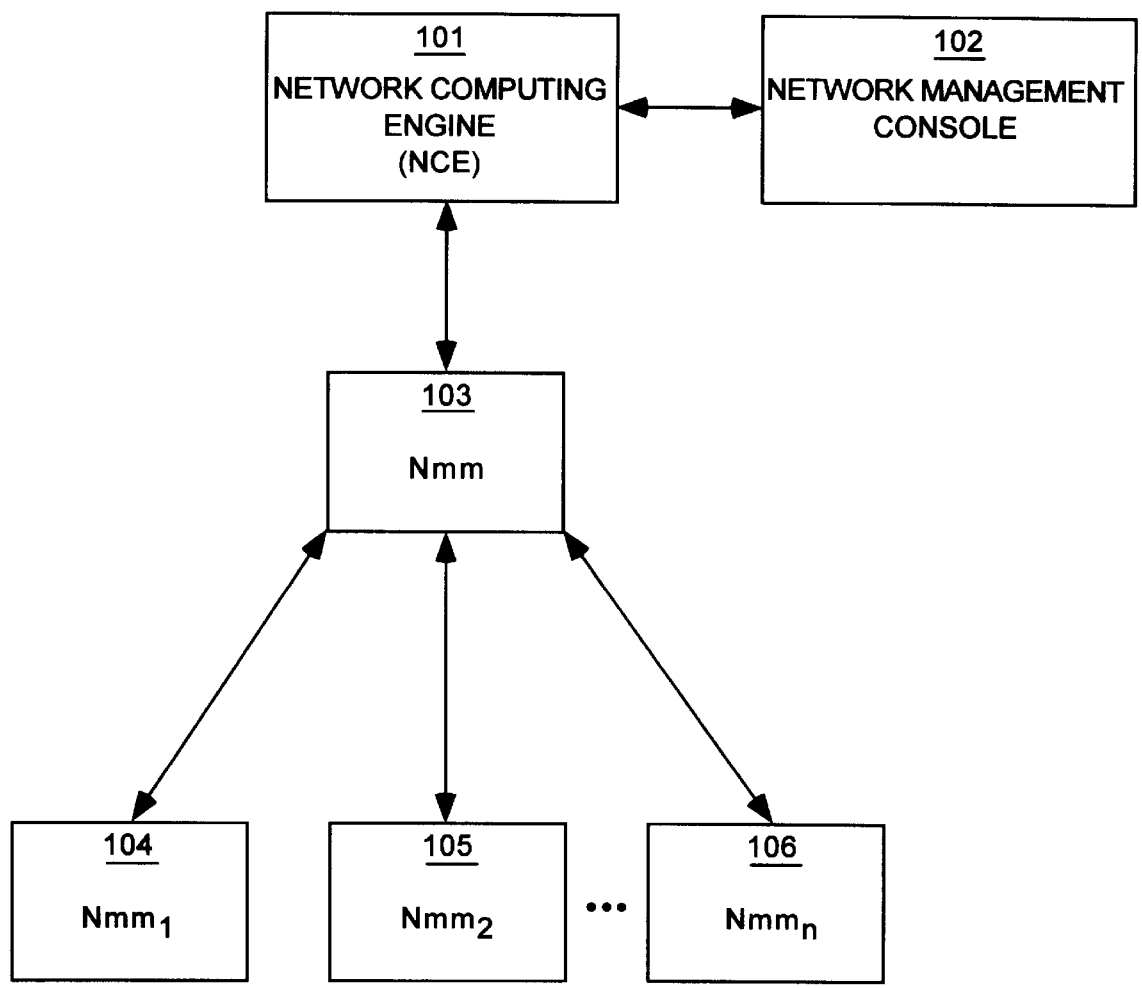
FIG. 1 illustrates a block diagram of devices in a networking system in which embodiments of present invention may be implemented.

An example of a configuration of a system implementing the methods and apparatus of the preferred embodiment is illustrated as system 100 in FIG. 1. The methods and apparatus to be described here are implemented in a network computing engine (NCE) 101. In other embodiments, the methods and apparatus to be described here may be implemented in a general purpose workstation which is coupled to a network. In one embodiment, NCE 101 is coupled to the backplane of a network management module (NMM) 103 as shown in FIG. 1. Network computing engine 101 further may be coupled to a network management console 102 for communicating various control information to a system manager or other user of network management console 102. As is illustrated, NMM's or concentrators as is described in U.S. Pat. No. 5,226,120 of Brown et al., (hereinafter "Brown") issued on Jul. 6, 1993, may be hierarchically linked in a variety of configurations, such as that shown in system 100 of FIG. 1. A more detailed description of network computing engine 101 will be described with reference to FIG. 2.

Figure 2:
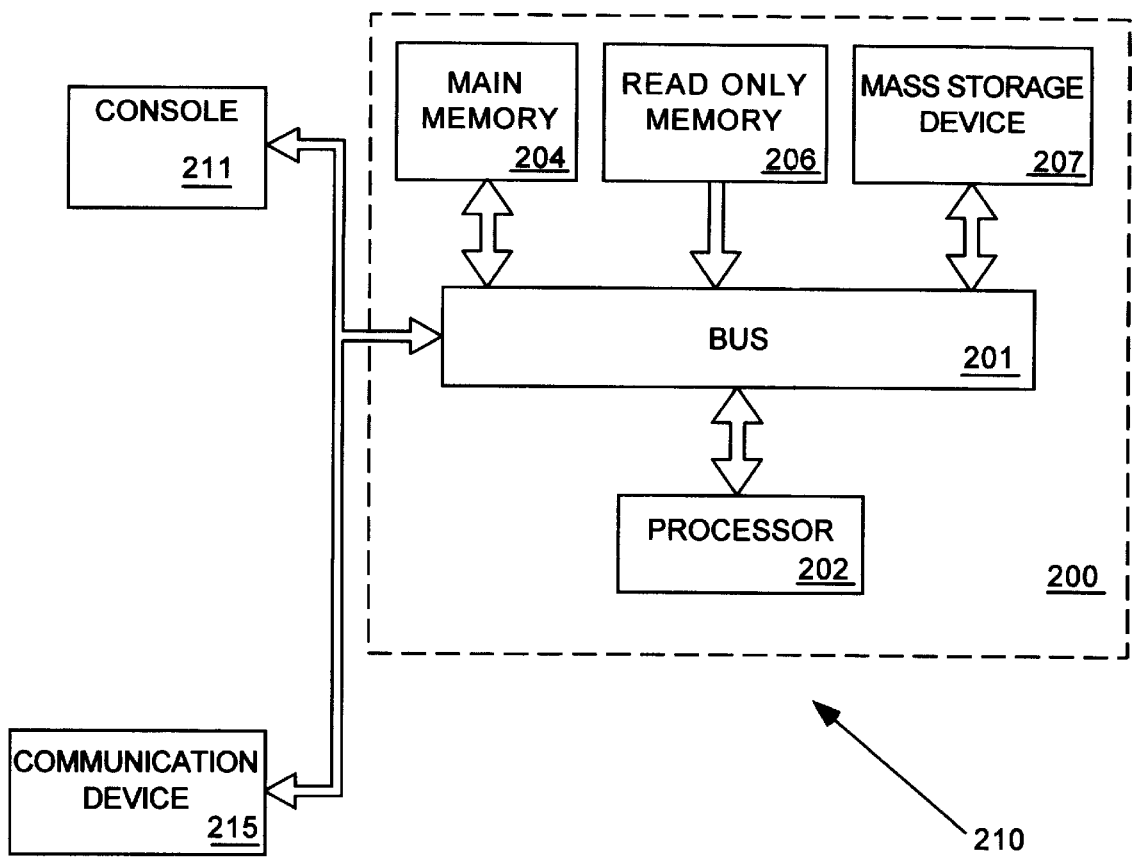
FIG. 2 shows a block diagram of a single network device which may be used for implementing some of the described techniques.

Referring to FIG. 2, a system 210 upon which one embodiment of a network computing engine (NCE—e.g., 101 of FIG. 1) of the present invention as implemented is shown. 210 comprises a bus or other communication means 201 for communicating information, and a processing means 202 coupled with bus 201 for processing information. System 210 further comprises a random access memory (RAM) or other volatile storage device 204 (referred to as main memory), coupled to bus 201 for storing information and instructions to be executed by processor 202. Main memory 204 also may be used for storing temporary variables or other intermediate information during execution of instructions by processor 152. System 210 also comprises a read only memory (ROM) and/or other static storage device 206 coupled to bus 201 for storing static information and instructions for processor 202, and a data storage device 207 such as a magnetic disk or optical disk and its corresponding disk drive. Data storage device 207 is coupled to bus 201 for storing information and instructions. System 210 may further be coupled to a console 211, such as a cathode ray tube (CRT) or liquid crystal display (LCD) or teletype coupled to bus 201 for displaying information to a computer user. In the implemented embodiments, another device which is coupled to bus 201 is a communication device 215 which is a means for communicating with other devices (e.g., NMM's or a network management console—e.g., 202 of FIG. 2. This communication device may also include a means for communicating with other nodes in the network. In implemented embodiments, this may include an Ethernet standard interface coupled to a CSMA/CD backplane for communicating network information with the NMM 213 and other NMM's in system 210. Note, also, that any or all of the components of system 210 and associated hardware may be used in various embodiments, however, it can be appreciated that any configuration of the system that includes a processor 202 and a communication device 215 may be used for various purposes according to the particular implementation.

In one embodiment, system 210 is one of the Sun Microsystems® brand family of workstations such as the SPARCstation brand workstation manufactured by Sun Microsystems® of Mountain View, Calif. Processor 202 may be one of the SPARC brand microprocessors available from SPARC International, Inc. of Mountain View, Calif.

Note that the following discussion of various embodiments discussed herein will refer specifically to a series of routines which are generated in a high-level programming language (e.g., the C++ language) and compiled, linked, and then run as object code in system 210 during run-time, for example by the SPARCompiler available from Sun Microsystems® of Mountain View, Calif. It can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

Figure 3:
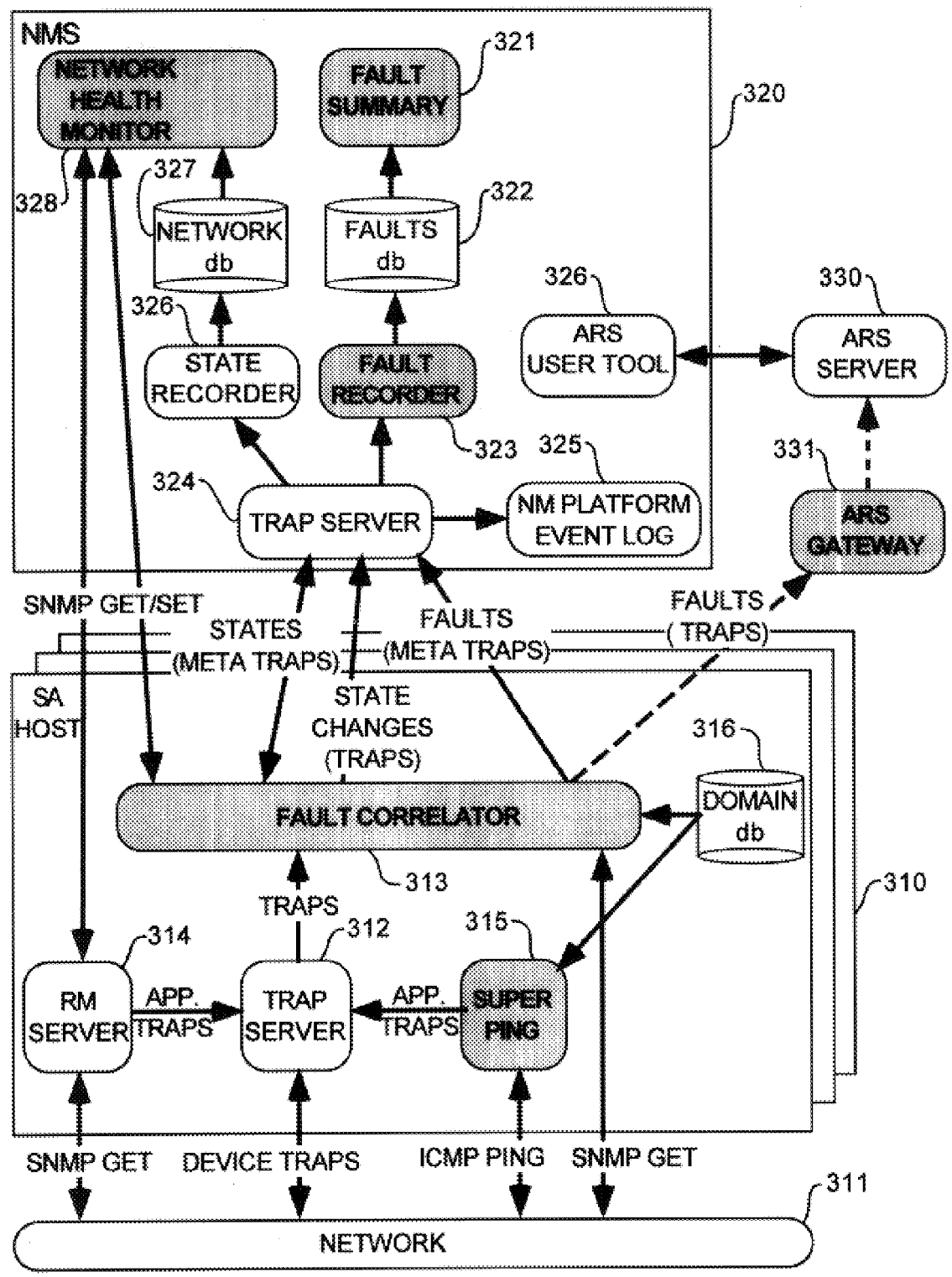
FIG. 3 illustrates a diagram of the processes operative within a network management station (NMS), and a network control engine (NCE) in embodiments of the present invention.

FIG. 3 illustrates the processes which are operative within devices in the networking system and devices of FIGS. 1 and 2. Network devices (e.g., NMM's) 311 in the networking system communicate with a process known as the trap server 312 in a single device in the networking system, such as a network control engine, or other device in the network, having a super agent host process 310. Communication is performed in four ways: 1) traps being transmitted from SA host 310 to the NMS 320 upon detection of certain condition (s); 2) the NMS 320 polling health data from the correlator 313 in SA host 310 via SNMP exchanges; 3) "pinging" or polling devices to determine functionality by the super ping process 315 that communicates via traps with the trap server 312; and 4) the fault correlator 313 polling devices to determine status.

Trap server 312 in SA host 310 serves buffering, storage, and other functions in the device until correlated by fault correlator 313. The trap server is a process that can be active on a distributed NCE or on the NMS console. Its function is to listen to SNMP traps which are received through port 162 which it binds to, in implemented embodiments, and forward them to any client application of the trap server 312. Fault correlator 313 is one such client of trap server process 312.

Fault correlator 313 collects data by listening to incoming traps, polling devices for data via either RM server process 314, directly "pinging" devices (prompting devices to determine their reachability) via super ping process 315, or polling a device to directly determine device status. In addition, it correlates traps not already correlated by another correlator in the networking system. Every time a trap is generated by an NMM or other SNMP agent (device or application) in the system or fault data is polled from an NMM or other SNMP agent, the correlator invokes a current rule base to evaluate new events in the system in relation to known events. For the purposes of the remainder of this application, fault events or simply events, consist of traps or polled network data (e.g. SNMP "Get" exchanges) responsive to certain network conditions. As each fault event is evaluated, a record of it is maintained, including such information as whether a similar event has been correlated before and thereby used to generate a "meta" trap. Meta traps will be discussed in more detail below, however, meta traps are generated by the fault correlator 313 upon the satisfaction of a certain number of conditions. These may include, but are not limited to, the occurrence of a certain number of events within a specified time period. This will be generally referred to as a rule and will be described in more detail below. Once a number of traps within a specified time period have occurred, the generated meta traps are sent to a second device, typically, a network management station (NMS) 320. The fault correlator 313 and super ping process 315 both use a domain database to determine the device(s) that they are responsible for correlating. Super ping process 315 generates a trap whenever device reachability status changes. These traps may also be correlated by a single or multiple correlators 313.

In addition to the meta traps describing faults, the correlator uses a rule base to derive the state (health) or network devices based on the traps of the data polled from the NMM's/SNMP agents. Every time the inferred or determined state of a device changes, according to defined rules, a state change meta trap is sent to the trap server 324 in the NMS 320 and then forwarded to the state recorder 326.

Meta traps are received by the NMS 320 via the trap server 324. The trap server 324 packages the traps, and passes them to the fault recorder 323 which maintains a long term record of meta traps received. In this manner, a record is kept of long term faults in the system and diagnosed, if required. The recorded faults are then put into a fault database 322 which may be accessed by fault summary process 321 for presentation of long term fault information to a network manager or other user of the networking system. It may also suggest probable causes for the fault, and/or possible solutions to correct the identified faults. This information is sent from the fault correlator 313 in the meta trap. Meta traps may also be recorded in an NM platform event log 325 for retrieval at a later date or other post-processing.

In an alternative embodiment, meta traps can be received by the NM platform event log and be post-processed by trap server 324. In either embodiment, a log is maintained of meta traps and the traps are serviced via presentation to the user of the NMS 320 information regarding the meta traps such as reporting device(s) and/or processes, probable causes, possible solution(s), and/or severity levels of the faults, according to implementation. Other processes which are operative within the network management station include the network health monitor 328 which extracts state information from the network database 327 which maintains a record of all network devices and their current status. The network health monitor 328 can then display the device(s) (logical, physical or containers) in color-coded form according to their status. The database is maintained by state recorder 326 as illustrated in FIG. 3 which records state changes received from the distributed correlators. Another set of features provided by implemented embodiments of the present invention is the action request system (ARS) trouble ticketing system available from Remedy Corporation, of Mountain View, Calif. The fault correlator 313 also provides faults in the form of trouble tickets to an ARS gateway 331 which provides this information to a second process via ARS server 330. Upon receiving meta traps, the ARS gateway 331 generates ARS trouble tickets and issues them to ARS servers such as 330. The ARS server may be viewed from any ARS client connected to the server such as 326 illustrated in FIG. 3. In addition, the long term meta traps generated by different correlators may also be maintained in the fault database and viewed by the network manager or other user during accessing by fault summary process 321.

As trap objects indicating discrete fault events are received by the fault correlator, a correlation algorithm is applied in order to determine whether a meta trap object should be generated. Correlation may be performed, but is not necessarily limited to being performed, upon each generation of a trap. In one embodiment, upon the reception of a trap by the correlator 313, the list of previously detected traps is scanned and each type is evaluated to see whether a specified number of traps within a specified time period have occurred. If so, according to pre-stored fault correlation rules, then a meta trap object is created and transmitted to the fault recorder 323 in network management station 320. A correlator may communicate fault and state information via meta traps to more than one network management station 320 which are specified in a list maintained in the correlator and which is user-configurable.

Figure 4:
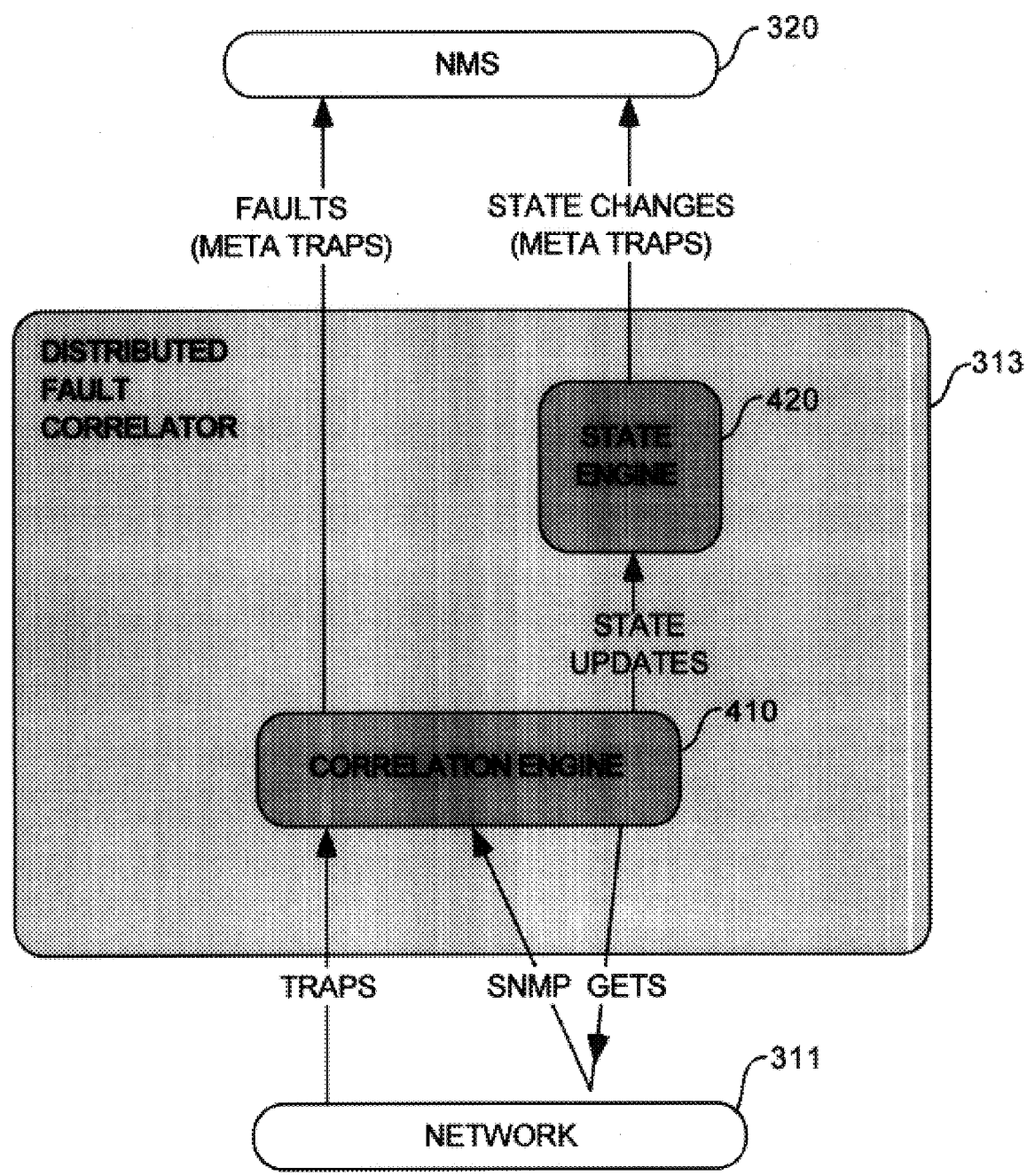
FIG. 4 illustrates a detailed view of a correlator used in implemented embodiments.

A detail of a distributed fault correlator is shown in FIG. 4. The correlator is comprised of two main components: the correlation engine 410 and the state engine 420. The correlator operates according to fault rules and state rules that control the two engines respectively. Fault correlation engine 410 is driven by events received from network devices or other application programs in the network 311. The correlation engine 410 may also perform active polling. This active polling may also be performed to determine the state of device(s). This active polling may be implemented with, but is not limited to, "SNMP Get" exchanges with devices and/or applications in the network 311. An event is interpreted according to the fault rules, state rules, and the current knowledge about the objects to which the correlation engine relates. An event can trigger any of the following:

1. sending of a fault report (meta trap)to the Network Management Station 320;
2. sending of a state update to the state engine; or
3. scheduling of an "SNMP Get" request to determine whether a fault condition is clear.

The state engine 420 is driven by state update messages received from fault correlation engine 410. Each message refers to one network object (i.e., a device or application). The state of the network object is modified according to the message parameters, and propagated up the physical and logical network hierarchies. Certain objects in the hierarchies refers to objects on a particular device (e.g. a port or slot). Thus, state changes on those objects result in state changes on the affected device(s). Other objects in the hierarchy refers to device(s) and/or groups of devices (e.g. all those devices in a particular building, or in a particular segment). The device hierarchies at this level may be maintained by a topology recording process in order that state changes effecting particular devices also effect the objects representing groups of devices (e.g. a building). This topology recording process may accept manual changes to the topology (e.g. as entered by a network manager) or may be determined automatically, in any number of ways. Thus, this network model is maintained by network object, according to each object's level in the hierarchy, and used to propagate changes to other network objects higher in the hierarchy (e.g. port or slot to a single device, a single device to other devices/groupings of devices).

The state engine uses an aging scheme to gradually clear certain state conditions. If the severity of an object state changes from low to medium, from medium to high, or any other state change in severity level, a state change notification is sent to the network management station 320 via a meta trap. Thus, in addition to network faults which will cause fault meta traps to be generated, the correlation engine will also generate state update messages which are sent to the state engine 420 in order to update the current status of network device(s) and/or application(s).

The state of an object is defined by a vector of severity levels assigned to the following fault categories: connectivity; error rates; components condition; load; configuration; and security. The severity level of each category is an integer value from 0—indicating fully-functional or operational condition, to 10—meaning non-functional. Levels of 1–3 are of low severity, 4–6 are medium, and 7–10 are high severity.

Figure 5:
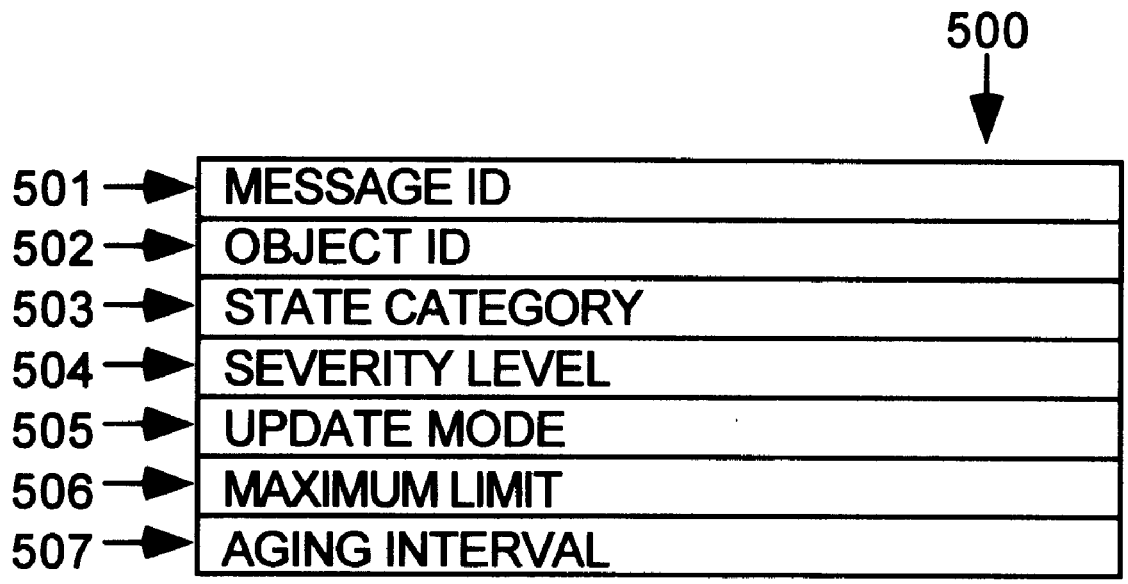
FIG. 5 illustrates a state update message used in implemented embodiments.

Some states are permanent or long-term in nature (for example, a fan failure in a network device) while other changes reflect a temporary or short-term problem (for example, the saturation of a network device). When an event of the permanent type occurs, the state condition is cleared only on evidence that the problem has been resolved. State changes of the temporary type will stay in effect for a certain period of time and then be decayed. The state engine is fed by state update messages generated by the correlation engine 410. Update messages have the format as illustrated in 500 of FIG. 5, and contain the several parameters: A message identification field 501 which can be used to update or undo the effect of this state change. Subsequent state changes will have the same message ID. An object identifier field 502 which uniquely identifies a physical or logical object in the network. The state category field 503 indicates one of the types state categories as referenced above: connectivity; error rates; components condition; load; configuration; or security. The severity level field 504 contains the severity level, an integer between 0 and 10. The update mode field 505 is a Boolean value indicating either "set" or "increment." This field specifies how the given severity should be used to compute the new severity level. Typically, a "set" change is used for longterm problems while short-term problems require a "increment" update to reflect an accumulated effect. "Set" is an absolute change in state, while an increment is a value indicating an addition to the current severity state. The next field is a maximum limit field 506 which is used in the case of the "increment" update. This indicates a maximum limit for the determined severity level. In "set" type messages, the maximum limit field is null or 0. Finally, an aging interval field 507 is used for indicating, in seconds, whether the effect of this update should be undone. This is applicable only for increment types of updates. Again, for "set" types of updates, the field will be undefined.

Figure 6:
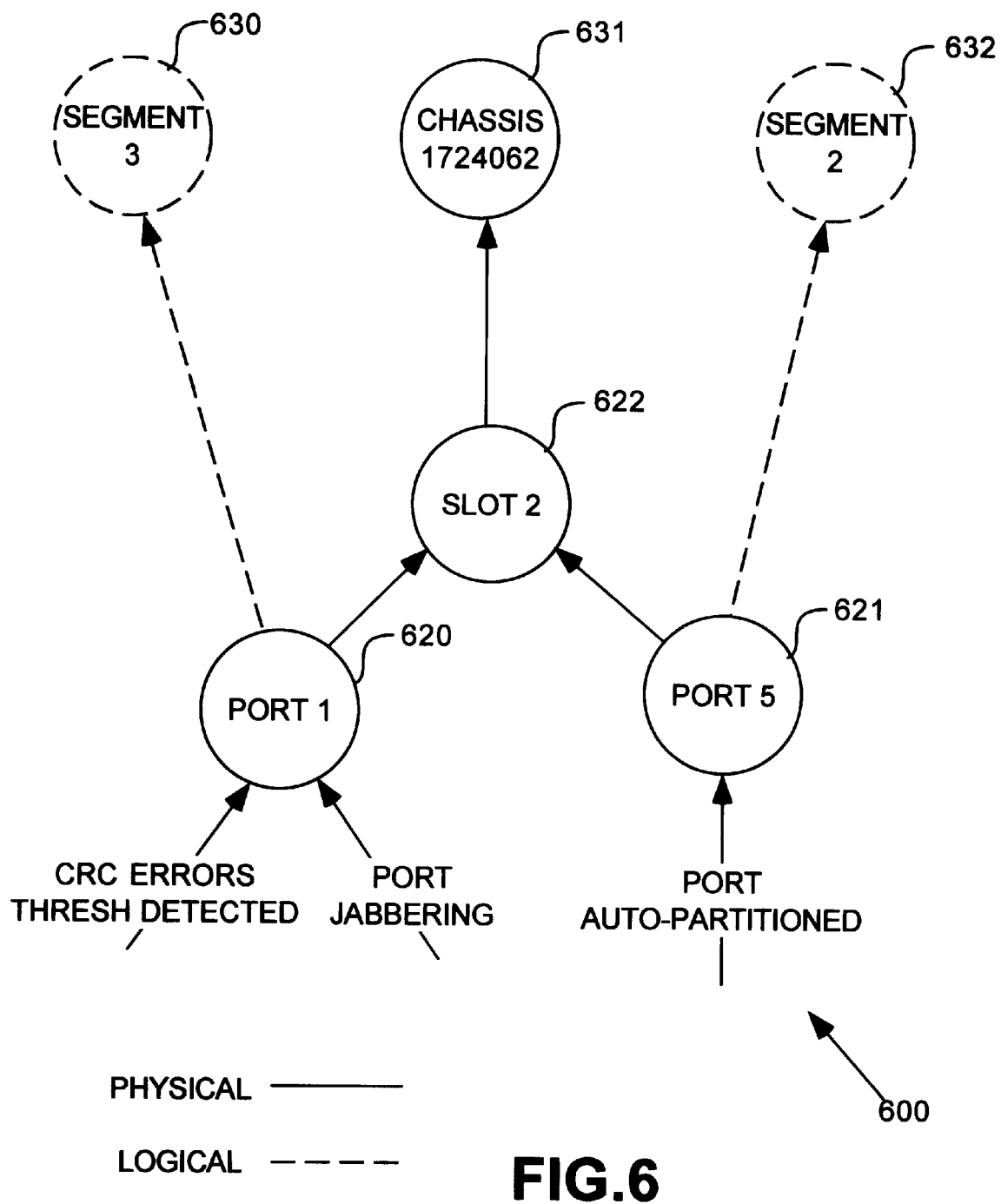
FIG. 6 shows a state diagram illustrating how state changes are determined for individual network devices.

The computation of network object states is done using a neural network model that is comprised of nodes and arcs connecting them. Nodes represent network objects. Arcs represent state updates. All arcs are uni-directional forming a tree structure. Each node has outgoing arcs connected to its physical and logical container objects through which states are propagated. Leaf nodes are lowest objects in the network physical hierarchy, typically ports or interfaces on network devices. Every state update message from the correlation engine is translated into and arc entering the leaf node that represents the relevant object. The hierarchy may be maintained internally in the correlator using data structures well-known to those skilled in the art. These arcs have a limited life-span, that is, they are removed once the condition is clear. FIG. 6 illustrates an example of a network model used for state updates.

As illustrated in FIG. 6, traps are sent to the correlation engine 410 as shown in FIG. 4. The correlation engine then associates each of these traps with individual objects in the network physical hierarchy such as the ports 1 620 and port 5 621. The state changes into two ports results in state changes to the logical entities represented by the dotted arcs, and the physical entities represented by the solid arcs. That is, state changes then are generated for segments 630 and 632 (e.g., VLAN's in the networking system) shown in FIG. 6. In addition, the state changes occur for slot 622 as illustrated in the figure. Finally, because the slot 622 also results in a state change for another network object, the chassis 631, a state change message is also generated for that device. Any other network object effected by the traps, such as 610, are changed in the same way.

Figure 7A:
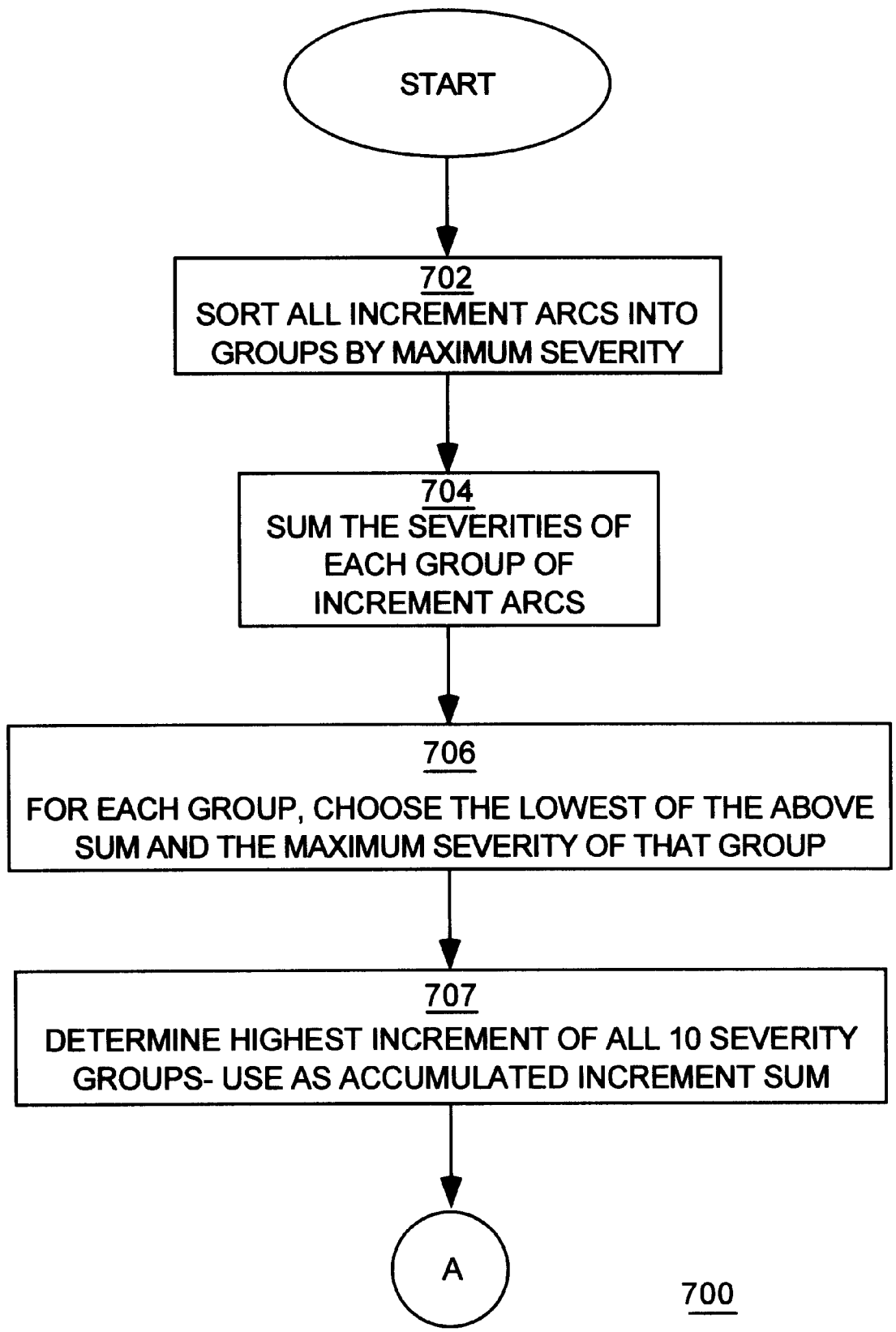
FIGS. 7a and 7b illustrate a process for determining the severity level for a state update message is determined.

The current severity of a state category of a leaf is computed in the manner as illustrated with reference to FIGS. 7a and 7b, and is propagated up through each device (logical or physical) in the hierarchy. Process 700 is performed for each object, and starts at a typical process entry point as illustrated in FIG. 7a. At step 702, all increment arcs for the object are sorted according to their maximum severity for any given increment, an integer value between 1 and 10. Maximum severity limits for any given increment are established in a configuration file as preset by a network manager or a user and is stored in the names as discussed in FIG. 5 above. Once the increment arcs are divided into these 10 groups, then a sum of the severities for the increment arcs of each group is determined at step 704. For each group, the lowest of either the increment sum and the maximum severity for the group is then determined at step 706. At step 707, the highest of the 10 increment arcs, as determined at step 706, is then used as the accumulated increment sum to be used for further processing in conjunction with the "set" arcs. Then, process 700 continues on FIG. 7b for processing of the set arcs and determination of the new severity level.

Figure 7B:
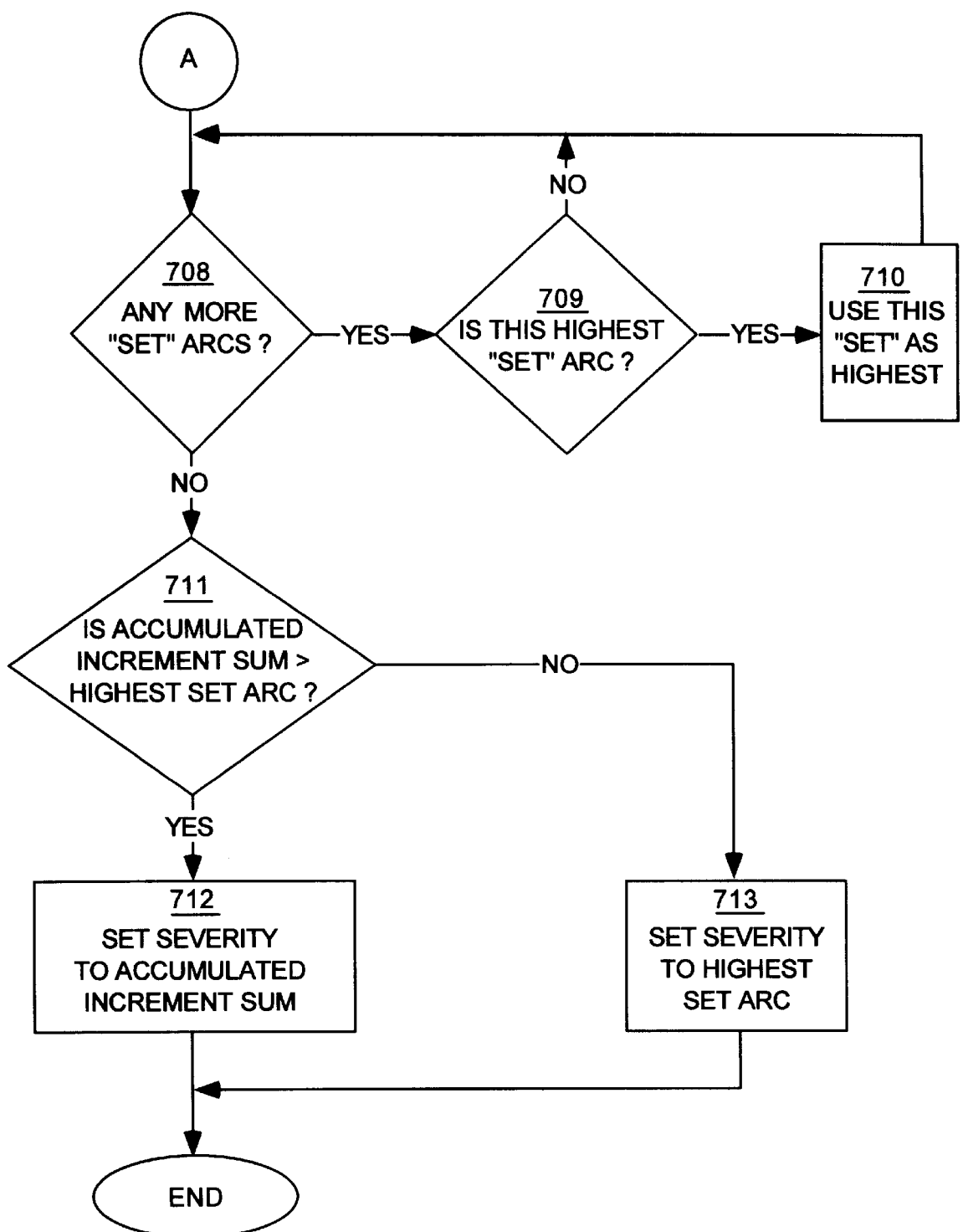

The portions of process 700 shown in FIG. 7b account for all the "set" arcs for any given device. At step 708, it is determined whether there are any more "set" arcs (state changes) for the device. If so, then it is determined whether the currently examined set arc at step 709 is the highest examined yet. If so, then this set arc is used as the highest set arc at step 710. If not, then the highest set arc is not adjusted and the process returns to step 708 to determine whether there are any more set arcs for the device. Once there are no more set arcs for the device as detected at step 708, it is determined whether the accumulated increment sum exceeds the highest set arc at step 711. If so, then the severity for the device is set equal to the accumulated increment severity at step 712. If not, then the state change for the adjustment in severity is set to the highest set arc at step 713. In either event, upon completion of steps 712 or 713, the device then has its state changed to the appropriate severity level, via the transmission of a "set" state change trap or message to the NMS 320 from state engine 420. The state change is then recorded by the state recorder 326, used to update the network database 327, and is eventually displayed upon the network health monitor 328.

The fault correlation engine 410 is implemented using an enhancement of the C Programming Language known as Rule extended Algorithmic Language (RAL) which is available from Production System Technologies. RAL is an extension of C that incorporates a rule evaluation algorithm for evaluation of fault events and, if necessary, generate fault reports (meta traps). Upon invocation the correlator registers with the trap server to receive all not previously correlated traps. Each time a trap is received, it is parsed and converted into an RAL object instance. The correlator can then scan its set of rules to determine if the trap object matches any of the specified fault rules, based upon the trap ID, the originator of the trap, and the trap attributes. This is accomplished by pushing the rule set onto the current context and invoking RAL's forward driven evaluation engine.

The fault correlator of implemented embodiments of the present invention currently supports two types of fault rules. The first type is known as a reduction rule that correlates a large number of traps of a similar type which originated from the same device into a single event. This process may then generate a meta trap. Rules of this type have the following format:

if a <trap-type> has occurred more than
        <number-of-occurrences>
        within the last <time-interval> => report a fault For example, if a particular type of trap has occurred more than five times within the last fifteen minutes, then a meta trap or fault report is generated.

The second group of fault rules which is supported and implemented in embodiments of the present invention are known as so-called "toggle" rules. Toggle rules are those that correlate at least two different trap or event types which causes a fault report to be generated to indicate the change in condition according to a last trap/event received. For example, if a communication link goes down a "link down" trap is received and the state of the link is "down." Subsequent "link down" messages are ignored because they do not result in a change in state for the device. If a "link up" trap is subsequently received, however, for the same device, the rule is thus toggled to the other ("up") condition, and a meta trap is generated indicating the change in state.

Figure 8:
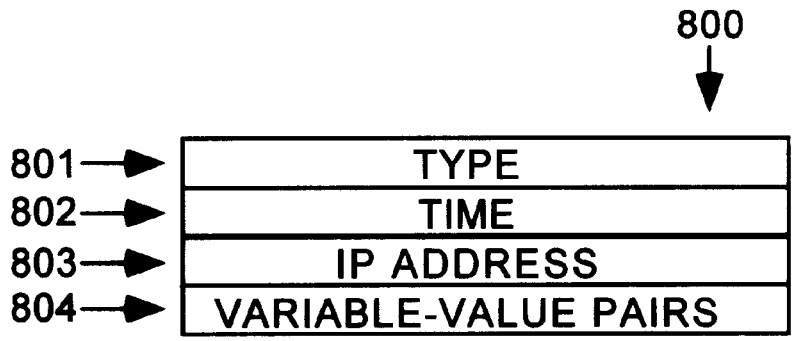
FIGS. 8 and 9 illustrate trap objects and raw trap records which are used for correlating traps.
Figure 9:
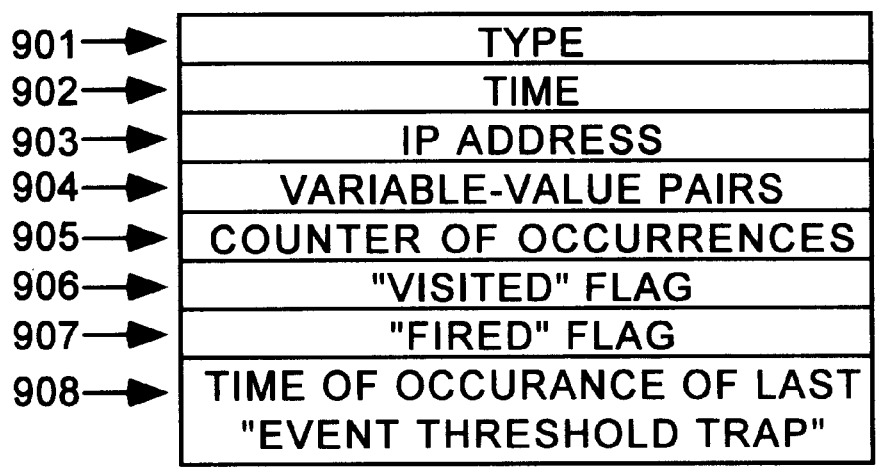

FIGS. 8 and 9 show the format of records which are used for processing raw trap objects. FIG. 8 illustrates 800 which is a raw trap object which is received from a device in the system, for example one of the NMM's in the network 311 shown in FIG. 3. 800 is a record which has a format which is generated in conformance with SNMP traps as specified in the networking industry standard document RFC 1215. 800 comprises a type field 801 which indicates the type of raw trap which has been detected within the network. As trap objects are received, they are maintained in a list for evaluation by the fault correlator 313 according to fault rules, which are specified by rule number. The specific definition of fault rules including the rule numbers is discussed in more detail below. In addition to the trap type, the trap object further comprises a time field 802 indicating the time at which the condition was detected. The trap object also contains a field 803 indicating the network address, in this instance, the internet protocol (IP) address, of the device reporting the trap. This allows the determination of faults with particular device(s) in the network. Lastly, the trap object contains variable-value pairs (var-binds) in field 804 which specifies, in more detail, the specific device(s), ports, attachments or other pertinent data for the trap in order to determine at correlation time whether the rule has been matched or not.

When traps are received by the correlation engine 410, they are converted to a raw trap record 900 shown in FIG. 9. 900 of FIG. 8 is an RAL object instance of the trap 800 discussed with reference to FIG. 8, in addition to several fields 905–908 which are used for control of the correlation process to determine whether the particular trap has been correlated or not, the number of occurrences of the event, etc. . . Count field 905 contains a counter of occurrences of the event of the given type. "Visited" flag field 906 indicates whether this trap has been examined by the correlator. "Fired" flag field 907 indicates whether the trap record has been used to generate a meta trap which was transmitted to the trap server 324 in the NMS 320. Lastly, in field 908, the time of the last of the events within the "event threshold" time period is recorded.

Fault rules are specified by a network manager or other user by defining the trap type, the number of occurrences and trap interval for creation of a meta trap object. These are defined in a text file and maintained in a data structure accessible to the correlation engine 410 at run-time. The data structure of fault correlation rule records has the format as illustrated in FIG. 10 and may be represented internally in the correlator using well-known programming techniques.

1000 of FIG. 10 shows an example record which may be used for maintaining a single fault correlation rule in implemented embodiments of the present invention. The record will include a first field 1001 which is a short string containing a short name of the rule. This field is followed by the rule number field 1002 which is used for associating received traps with the defined rules. The rule number is an integer which is used for matching traps to define rules. The next field is the problem type field 1003 which is a long description of the type of fault which has been identified. The following field is a problem description field 1004, which is a long English-language description of the problem identified by the rule. The next field 1005 is a severity field which is an integer value indicating the relative severity of the rule, if it is determined to be correlated, which ranges from 0–10 wherein 0 is an operating condition and 10 is a failure.

Event threshold field 1006 contains an integer value specifying the number of occurrences of the trap which before the rule will be considered to be matched and thus a fault record or meta trap is generated. The next field in the record is the time interval field 1007 which is an integer value specifying a time, in seconds, in which the number of threshold traps specified in field 1006 must be met in order to match the rule. The next field is the age time field 1008 which is used for aging out traps. The RAL object instance is removed after the "age time" threshold specified in this field has expired. The escalation threshold field 1009 is an integer value representing the number of new traps after a rule has been matched which must be received within the time interval in order to generate another meta trap known as an "escalation" trap indicating that the problem severity should be increased. Again, this is an integer value indicating the number of events which must occur after the initial firing of a rule. "Rule Active" field 1010 is for specifying whether the rule is active or not. It is a Boolean value, specifying whether for this given session of the correlator that the rule should be activated or not. Finally, the fields 1011 and 1012 are the problem cause and problem solution fields which are text fields containing probable problem causes for the fault and problem solutions in text form. These are later used by the fault user interface for displaying the current status of the network and possible problems along with their associated solutions.

An example of fault correlation rule for use in an Ethernet-type network is shown below. This uses the format as specified in the record 1000 shown in FIG. 10 discussed above:

| Type: LocBridge OperChnge | | |
| --- | --- | --- |
| #Severity | 37 | 4 |
| #EVENT_THRESH | 37 | 2 |
| #TIME_INTERVAL | 37 | 300 |
| #AGE_TIME | 37 | 3600 |

-continued

| Type: LocBridge OperChnge | | |
|---|---|---|
| #ESCALATION_THRESH | 37 | 2 |
| #RULE_ACTIVE | 37 | 1 |
| #PROBLEM_CAUSE | 37 | The local bridge's spanning tree algorithm has resulted in changing its state between active and standby. |
| #PROBLEM_SOLN | 37 | Check if the state change was due to a network failure requiring a topology change. |

Note that this is shown for example only, and that many such rules may be defined for any variety of devices and/or networks, according to implementation. Note than any or all of the rule parameters may be modified in an implementation-dependent manner. This may include manual editing by the user of configuration files containing rule definitions, or by the issuance of directives to a computer program (e.g. resident in the SA Host 310), such as a configuration manager, which can create, modify, or delete any and/or all of the rule parameters, or rules.

When a fault condition is triggered by matching of the predefined rules as discussed above, by the occurrence of a specified number of traps of a specified type of fault have occurred within a certain number of times within a given time interval then a meta trap object is created and sent to fault recorder 323. A meta trap object is illustrated with reference to 1100 of FIG. 11. The meta trap object contains the following fields: A problem type field 1101 is a name identifying the problem; a description field 1102 which is a long English language description of the identified problem; the unique identifier of the device 1103 which contains a name, address, or other unique identifier for the device; an agent address field 1104 which is used for identifying the address of the agent reporting the event; a fault category field 1105 for specifying the rule number of the fault; a severity field 1106 indicating the severity of the problem which has been detected, typically represented as an integer between 0 and 10; a vendor field 1107 indicating the vendor name of the affected device; a probable cause field 1108 which contains text indicating a probable cause for the reported problem; a possible solution to the problem 1109 which is a text field indicating possible solutions to the identified problem; a counter field 1110 indicating the number of correlated traps to generate this meta trap; a correlator identifier field 1111 indicating a name, address or other unique identifier of the correlator generating the meta trap object; a meta trap ID field 1112—a unique identifier for the meta trap object being generated; and finally, a correlation field 1113, in one embodiment represented as an integer value, indicating whether the meta trap is a "normal," "escalation," or "summary" trap.

Figure 11:
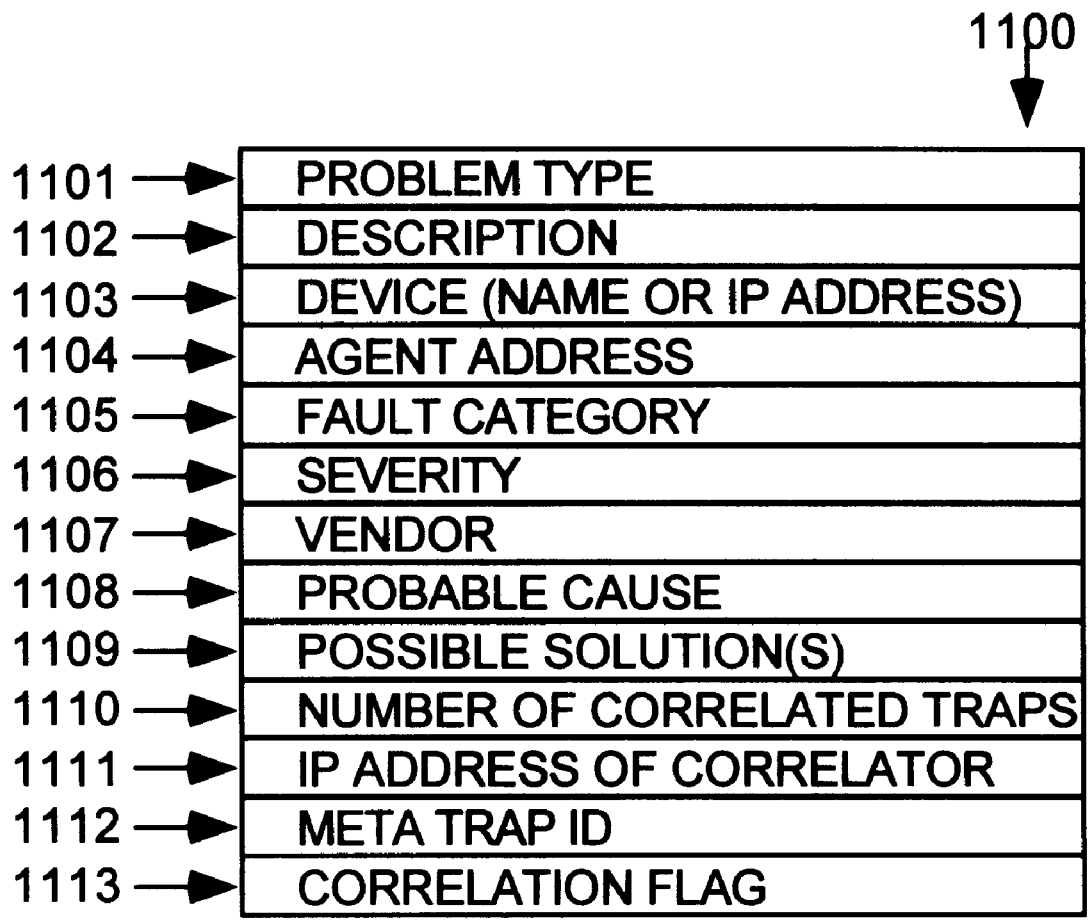
FIG. 11 shows a structure of a metal-trap object which is generated after correlating trap objects and a fault rule has been met.

RAL objects such as 900 are not deleted after a rule has been matched. The counting and evaluation of raw trap objects continues until expiration times for each rule have been reached. At those times, RAL trap objects instance(s) are deleted. After a rule has been matched and the receipt of additional traps of the same type, a special rule is invoked to determine whether a specified number of new traps were received since the previous meta trap was sent. If this threshold is exceeded, then another meta trap object having the same format as 1100 of FIG. 11 is generated which is known as a "escalation" trap. The escalation trap has a similar format with the only exception that the trap count field is increased, and the severity level is increased by two indicating that the problem is more serious than previously reported. This again may assist the user in determining whether a more serious condition is present in the affected device(s). In order for an escalation trap to be generated, an escalation number of traps should be received, as specified in field 1008, since the initial generation of a meta trap in order to generate an escalation trap. The format of an escalation meta trap which only update the number or count of correlated traps field 1109 are referred to as summary traps. Summary traps are generated every "age-time" interval since the first raw trap for the rule arrived provided that additional traps arrived between the last meta-trap that was sent and the "age-time" interval specified in field 1007 of the fault rule for the type of event. As discussed above, normal, escalation, and summary meta traps are all distinguished by unique integer values in field 1111 of the meta trap object.

Figure 12:
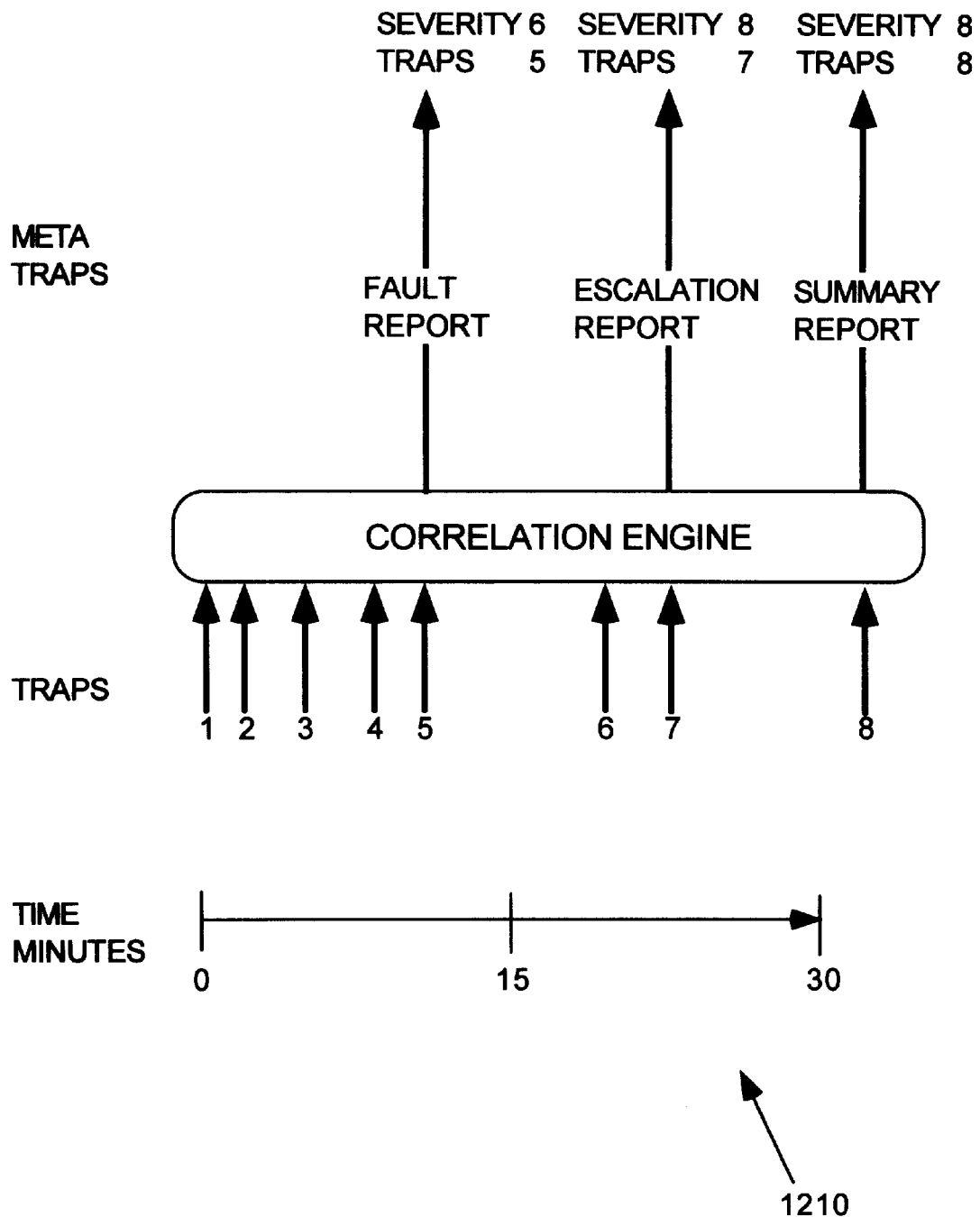
FIG. 12 illustrates the operation of a fault correlation reduction rule.

FIG. 12 illustrates graphically for any given reduction rule, the relationship between the generation of initial fault report, the generation of an escalation report, and the generation of a summary report caused by specified numbers of traps within given time interval. Thus, in the illustration shown as 850 of FIG. 8b, for the rule illustrated a fault report which was generated on five traps within a 30 minute (1800 second) time interval. Upon five traps being detected a fault report will be generated with the severity level 6. Upon an additional two traps detected after the first meta trap was sent, an escalation report will then be generated with the severity level increased by two, that is, severity level=8. Finally, a summary report is generated when the expiration time of the first raw trap occurs.

Toggle rules are defined in the same way as standard rules, however, rules for matching events (e.g., "link-up" events and the "link-down" events), are defined by the same rule. Toggle rule traps are treated in a slightly different way than standard traps. The event threshold and escalation threshold fields are ignored. RAL object instances are generated upon each reception of a toggle rule trap which changes from a previous state of the device. These are defined in a table by rule number which is separately specified in embodiments of the present invention. The age time field is used for toggle rule traps wherein if another trap does not occur within the time interval specified in the age time field then the RAL instance of the trap is disposed of. Treatment of toggle rules is otherwise the same as for reduction rules.

The operation of "toggle" rules is graphically illustrated with reference to FIG. 13. In contrast to reduction rules, toggle rules simply generate only a single type of meta trap upon a state change. No escalation or summary reports are generated. As previously discussed, toggle rules map to at least two events, wherein each causes the effected object(s) to change state. In most implemented embodiments, most toggle rules initially fire upon a change in state of the object from some default condition (e.g. link "up") to some other condition which is the opposite of the default (e.g. link "down"). As illustrated in the diagram 1300 in FIG. 13, the change in state to the "down" condition, results in the correlator polling, at regular intervals which are user-defined, the effected network object(s) in order to determine whether the state has resumed it's default. Thus, as illustrated, an initial trap is received indicating that the link is "down" and a fault report is generated. Subsequent thereto, SNMP Gets are generated at some regular interval wherein no additional meta traps are generated until a subsequent state change occurs. In the illustrated example, a "cleared" fault report is generated when the link resumes a state of "up" and no additional SNMP Gets nor fault reports are generated. That is until, again, a change in state is detected, as illustrated in FIG. 13. Any number of types of events may be collapsed into a single toggle rule allowing this "toggling" between a first and second state (e.g. "up" and "down").

Figure 14A:
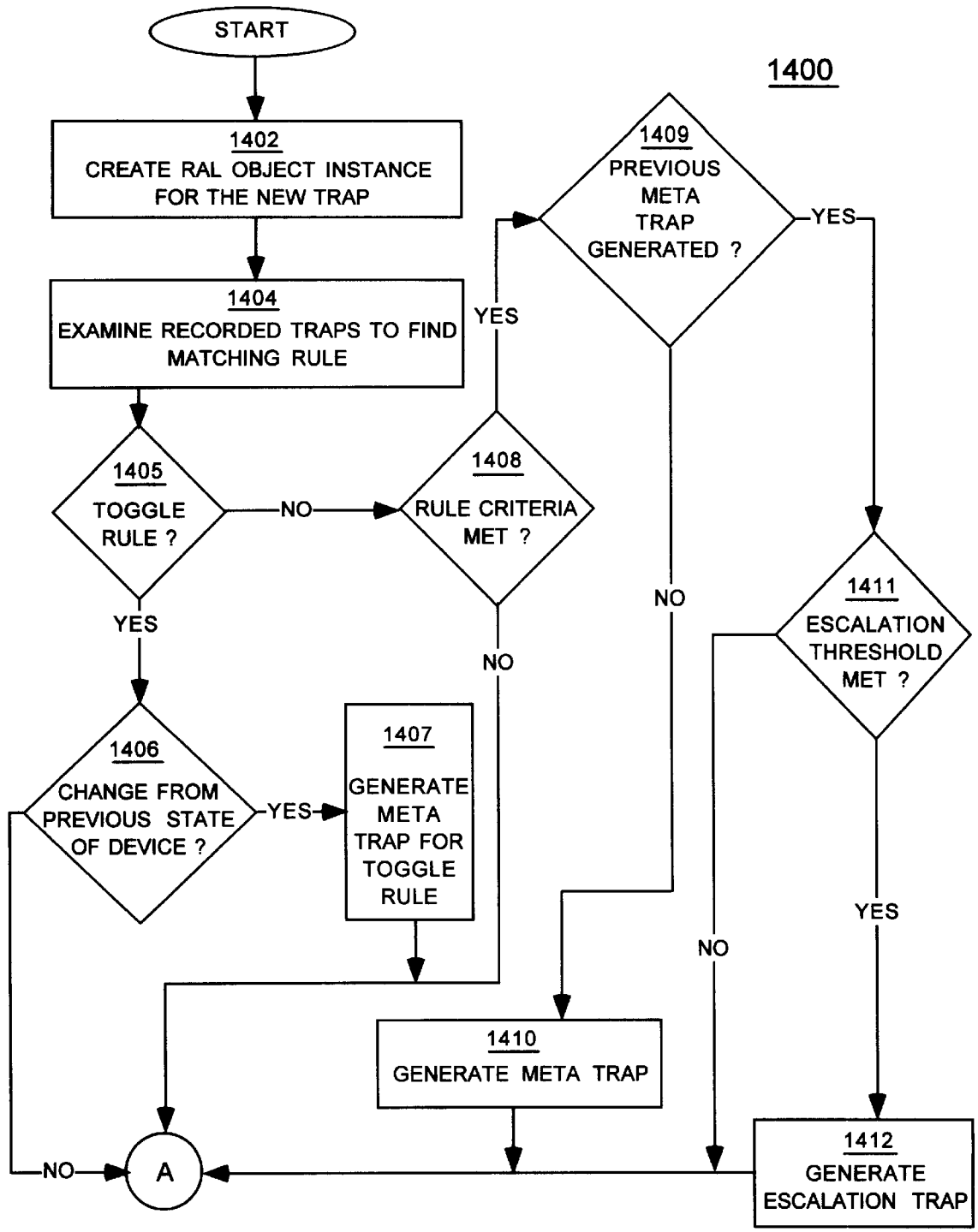
FIGS. 14a and 14b are flowcharts of a method for correlating traps.
Figure 14B:
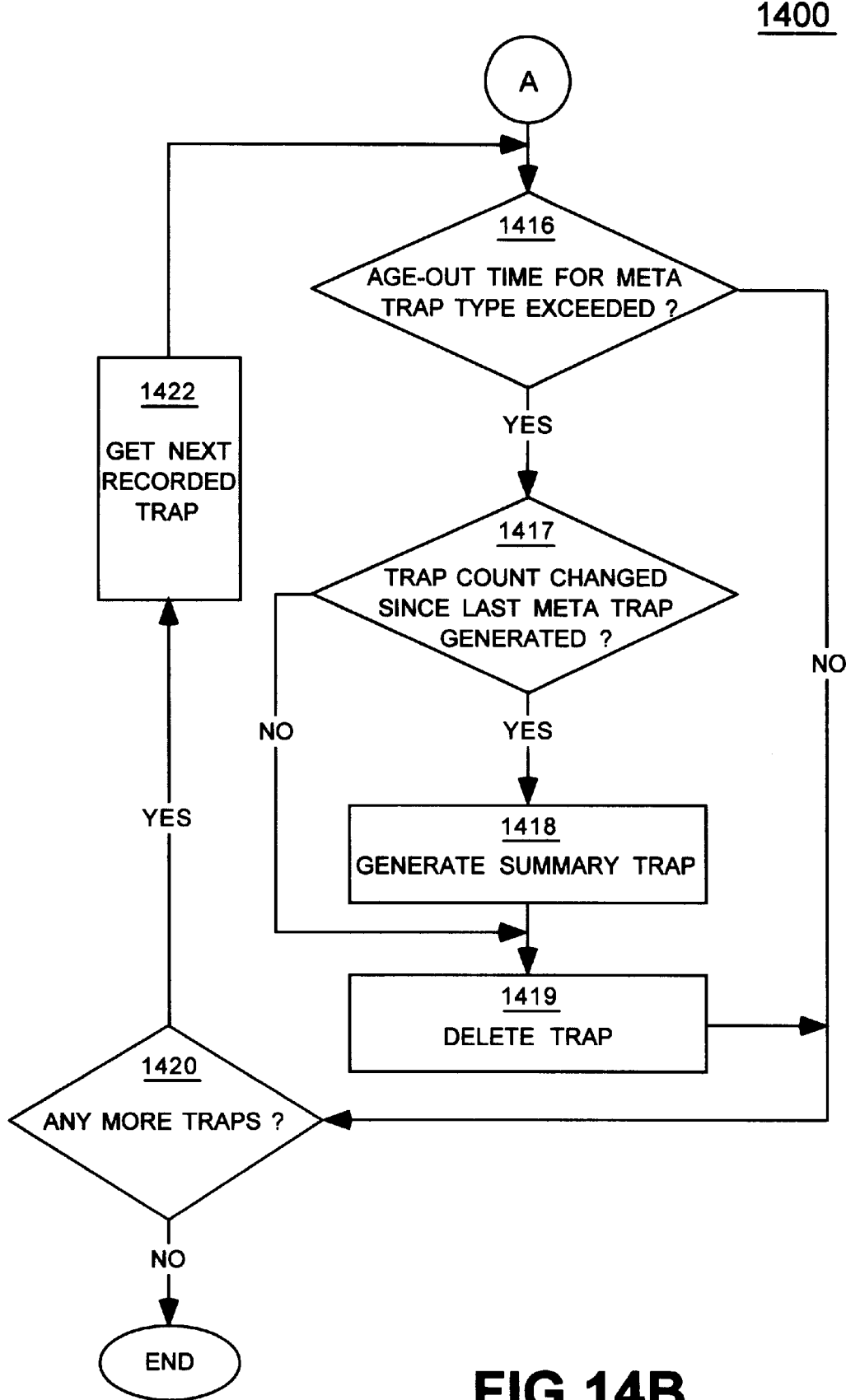

FIGS. 14a and 14b illustrate a process which is performed upon detection of a trap by trap server 312 as passed to fault correlator 313. As previously discussed, upon detection of traps, the correlator will determine whether a given number of traps within a specified type have met the rule criteria within the time threshold specified by the rule.

Figure 15:
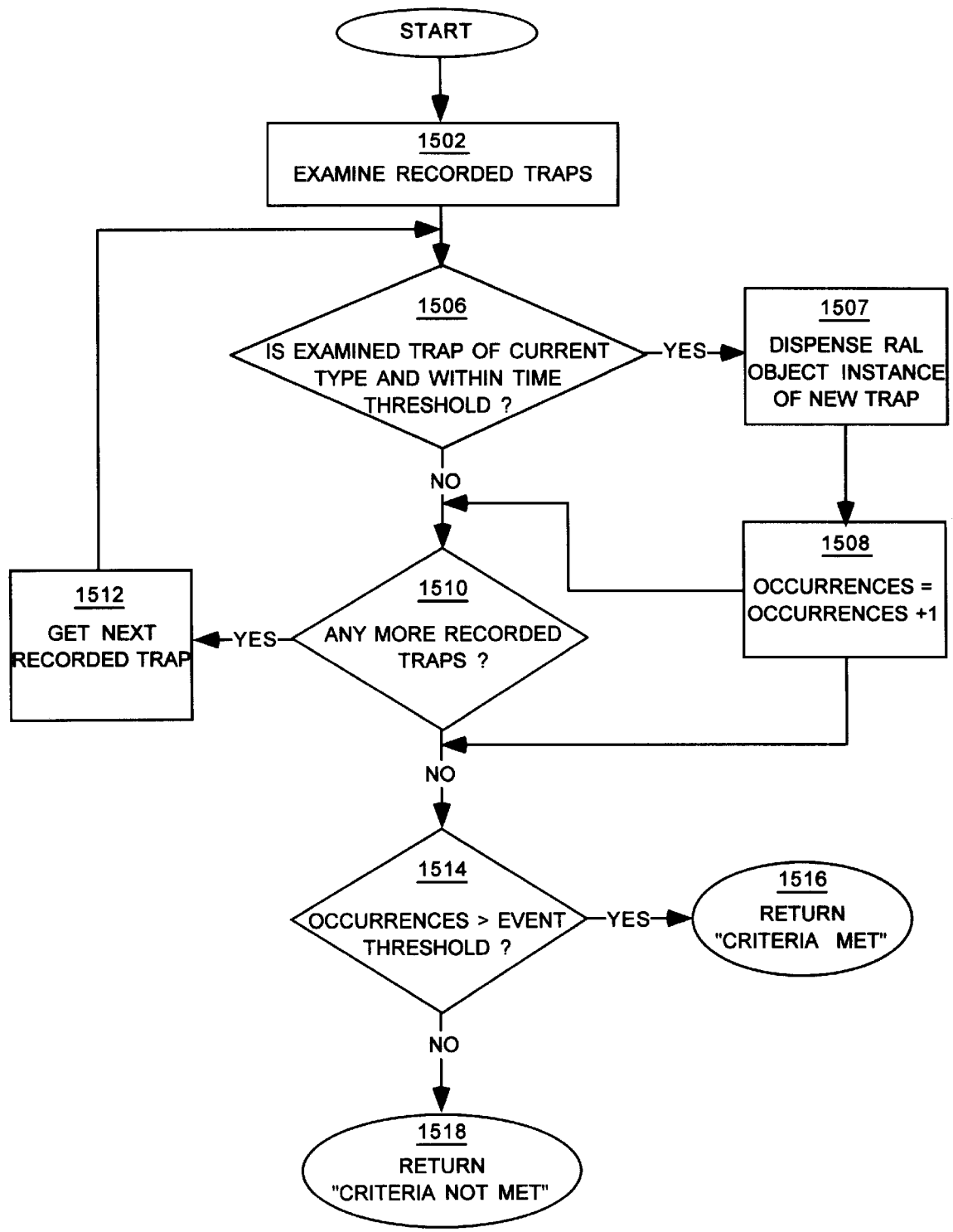
FIG. 15 illustrates a process for determining whether the criteria for generation of a meta trap has been met.
Figure 16:
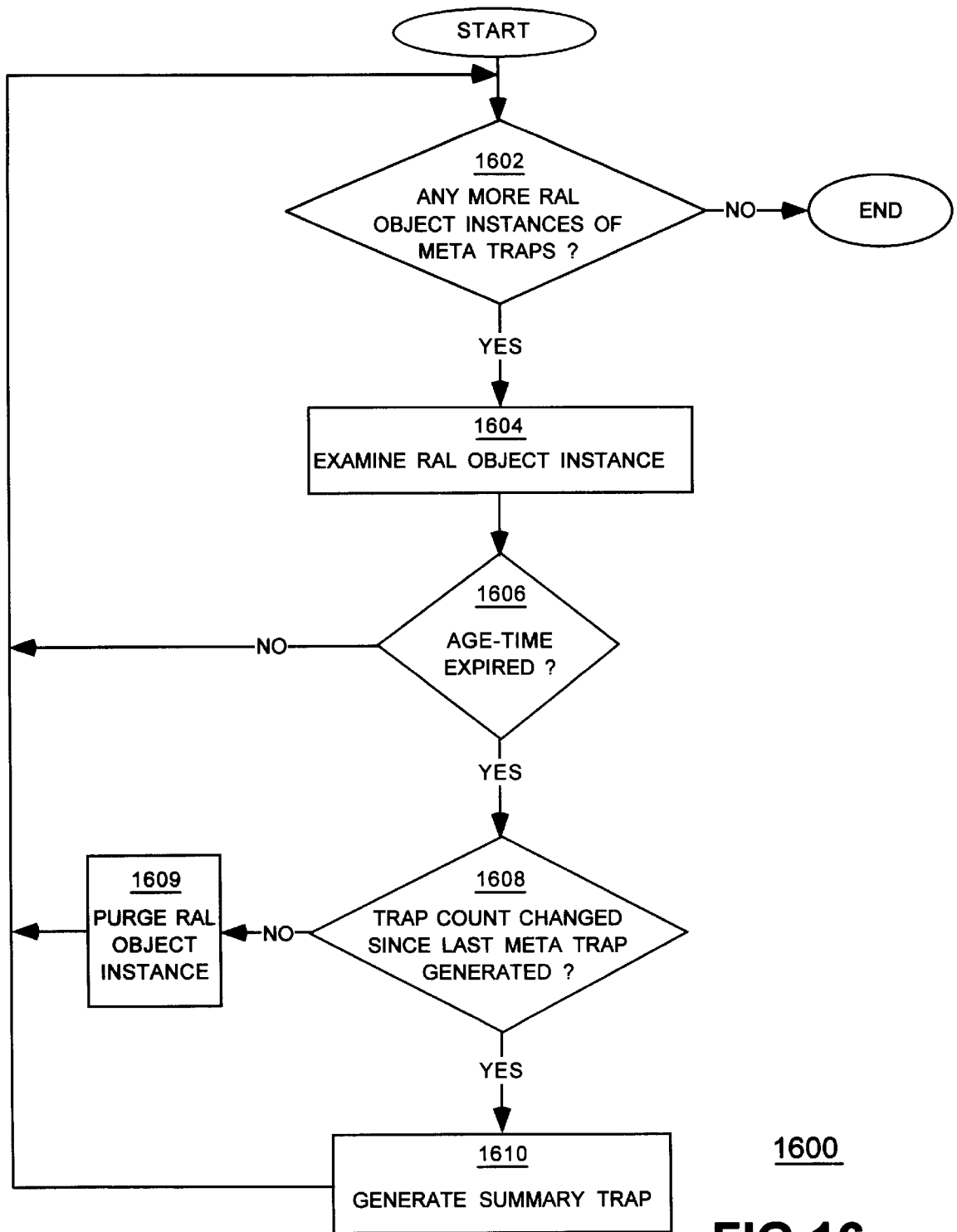
FIG. 16 illustrates a process which is performed for generating summary meta traps.

Process 1400 of FIGS. 14a and 14b is a detailed illustration of the process steps which are performed upon the detection of each trap from devices in the network. First, at step 1402, a RAL object instance of the trap is created. The list of recorded traps may then be examined at step 1404 to determine the matching fault correlation rules. If the matching fault is a "toggle" rule as determined at step 1405, then it is determined whether the new trap has caused a change in state for the device at step 1406. If so, then a meta-trap is generated at step 1407 reflecting this change. If, however, the new trap relates to a standard reduction rule (it is not a "toggle" rule), then it is determined whether the rule criteria for the new trap have been met at step 1408. This may be determined by performing a test to see whether a threshold number of recorded traps of the given type have occurred within the threshold time interval. A more detailed view of step 1408 is shown in FIG. 15. If the rule criteria have been met, as detected at step 1408, then it is determined at step 1409 whether a previous meta trap has been generated for the particular rule. If so, then it is determined whether the escalation threshold has been met at step 1411. If so, then an escalation trap is generated at step 1412—the number of traps has exceeded that required for generating an "escalation"-type meta-trap. Process 1400 then continues on FIG. 14b.

If a previous meta trap had not been generated, as detected at step 1409, then an initial meta trap is generated and sent to the NMS 320 at step 1410. Upon generation of either an escalation or meta trap, RAL object instances may be purged from the meta trap queue, according to their respective age-out time. This is shown in FIG. 14b. Process 1400 proceeds to FIG. 14b wherein at steps 1416–1422, meta traps are aged-out. That is, at step 1416 the age-out time for each meta trap instance is examined (according to its type) from the last meta trap generated. It is determined whether the last meta trap generated was greater than or equal to the age-out time specified in the rule. If so, then, at step 1417, it is determined whether the trap count for the meta trap has changed since the last generation of the meta trap. If so, then a "summary" meta trap is generated at step 1418. If not, or on the completion of step 1418, the meta trap RAL object instance is deleted at step 1419. It is then detected at step 1420 whether any more traps need to be examined. If so, then the next recorded trap at step 1422 is obtained, and steps 1416 through 1420 are again repeated until there are no more unexamined meta traps in the queue. In this way, meta traps are aged-out and removed from the queue.

FIG. 15 illustrates a more detailed sequence of process steps which may be performed at step 1408 in FIG. 14a to determine whether the rule criteria have been met. In implemented embodiments, the matcher in the RAL engine is used. However, in other embodiments, a sequence of steps as illustrated may be performed. At step 1502, the recorded traps are examined. At step 1506 it is determined whether the trap being examined is of the same type and within the specified time threshold for the rule for the recorded trap being examined. In order for the specified type condition to be met, the correlator examines the var-bind pairs of the trap in order to determine the manner in which the rule is applied. For example, if two events occur which have the same rule number but affect different devices, and the rules are only relevant if the events occur to the same devices (e.g. same range of IP addresses) then they will be treated as separate types of events, and will not be correlated together. The application of the var-bind pairs to make these distinctions is hard-coded into the underlying program, however, var-bind pairs in the rules themselves are user-configurable, according to implementation. Different applications of the var-bind pairs may include, but not be limited to, specification of certain port numbers, MAC (media access control) addresses, current attachment of device(s), or other information contained within the var-bind pairs. If the examined trap is of the current type and has occurred within the time threshold, then at step 1507, the RAL instance for the trap is disposed of. This is because the current trap is then recorded into the recorded trap being examined. The occurrences counter is of the recorded trap is then incremented at step 1508. Then, step 1508 proceeds to step 1514.

If there was not a match of the type of trap and time threshold, as detected at step 1506, then step 1510 is performed to determine whether there are any more recorded traps to be examined. If not, then 1510 proceeds to 1514. If so, however, at step 1512 the next recorded trap is received and process steps 1506 through 1510 repeat. Once all recorded traps in the trap queue have been examined at step 1510, then it is determined whether the occurrences counter has exceeded the events threshold for the trap. If so, then the process returns at step 1516 with a flag indicating that the "criteria have been met". If not, however, then a specified flag criteria not met may be passed back to the calling routine at step 1518.

Process 1600 shows a process which is performed at regular intervals, according to implementation, which is used for determining whether summary traps should be generated. In effect, this process handles the additional circumstance where the trap count has changed, but yet a standard meta or escalation trap did not necessarily get generated. In this instance, a summary trap is generated. Thus, process 1600 commences at a typical process entry point, and it is determined at step 1602 whether there are any additional RAL object instances which haven't been examined. If so, the process continues, and the RAL object instance for the meta trap is examined at step 1604. If the age-time has not expired for the examined RAL instance, as determined at step 1606, then the process continues and returns to step 1602. If so, however, then the process proceeds to step 1608 to determine whether the trap count has been incremented since the last meta trap was generated (i.e. no additional meta or escalation trap was generated). If so, then a summary trap is generated. If not, then the RAL object instance is deleted at step 1609. The process continues at step 1602 wherein if no unexamined RAL objects remain, then the process is complete. This process is performed by the correlator independent of whether traps are received or not in order that summary traps may be generated when trap counts change, even if no additional problems (e.g. escalations) have been identified.

In addition to generating fault reports (as meta traps) to the network management station, the correlation engine also generates state updates which are transmitted to the state engine shown in FIG. 4. State updates are generated according to state rules which are generated according to the state diagram discussed with reference to FIG. 6 above. State rules are associated with traps which may be generated, and are stored according to rule number of the traps which are detected. An example of a state rule is illustrated with reference to FIG. 17. Like a reduction or toggle rule, each state rule is referenced by a rule number 1701 which corresponds with rule numbers for each of the traps as previously discussed. Thus, an event of a given type may also result in a state change occurring, as detected by correlator 313 and received by the NMS for the monitoring of network health. The next field is a state category field 1702 which is an integer value specifying whether the state rule refers to a connectivity, error rate, components condition, load, configuration, or secured state rule. The next field is severity level field 1703 which is an integer value between 0 and 10 referring to the severity level of the state change. An update mode field 1704 is an integer value specifying whether the state change is either a "set" or "increment" state change specifying whether the given severity level should be used to compute the new severity level, as discussed with reference to the state diagram in FIG. 6, above. A maximum limit field 1705 which specifies the maximum limit for the computed severity level which, as discussed with reference to the state diagram, is relevant only in the case of a "increment" state update. Finally, the state rules contain an aging interval field 1706 which is an integer value specified in seconds after which the effect of the state update should be undone. This is again applicable only for "increment" types of updates. Examples of state update rules are shown below:

For example, the state rule for an NMM Saturation trap can be:

State Category=Load

Severity Level=1

Update Mode=Increment

Maximum Limit=6

Aging Interval=1800

And a state rule for a Power Supply Failure trap can be:

State Category=Load

Severity Level=9

Update Mode=Set

Any number of types of state change rules may be defined and used to display a color-coded representation of network health at various levels of abstraction (port, chassis, hub, etc. . .) on a user interface display, as will be described in more detail below. As state updates are sent by the correlation engine to the state engine, and the state change is then sent to the network management station, these state changes are recorded in the network database 327, and can be displayed by the network health monitor 328 to the user or network manager.

Figure 18:
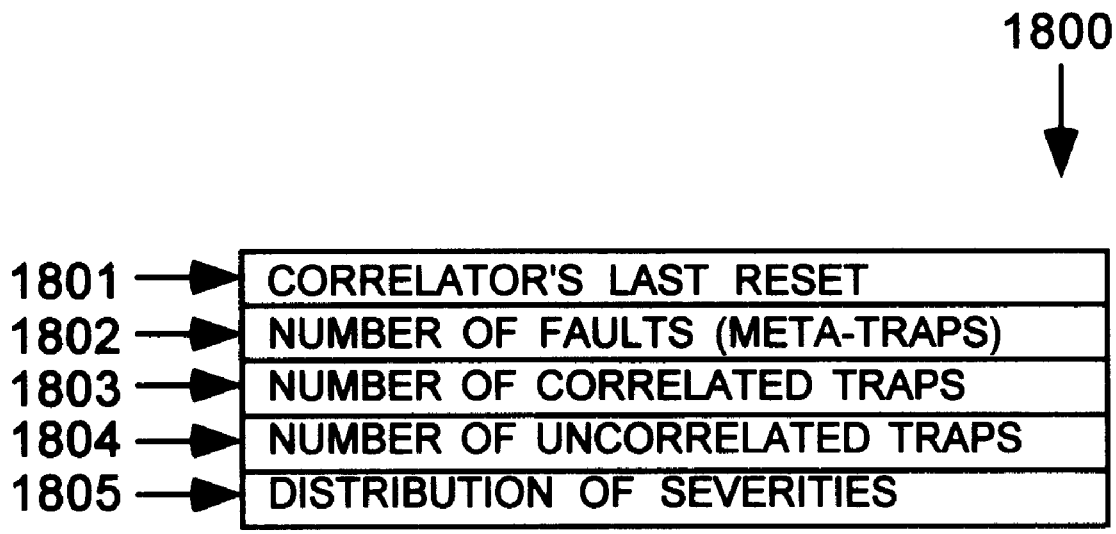
FIG. 18 shows a record which may be used for storing statistical information regarding correlated traps by a single correlator.

Statistics about each correlator are accessible by SNMP requests from the fault summary process 321. These are illustrated and discussed with reference to FIG. 18. 1800 of FIG. 18 shows an object which is accessible by SNMP requests in the correlator which indicates the status of operation of the correlator. A field 1801 maintains a record of the date and time since the last reset of the correlator. Thus, all traps which are currently stored in the correlator have been stored since this previous date and time. A counter 1802 is maintained of the number of correlated traps. In addition, another field 1803 maintains a count of the number of uncorrelated traps. Field 1804 indicates the number of meta traps generated by the correlator. Finally, a distribution or count of the different severities of meta traps generated is maintained in a last field 1805 of the record such as a separate set of integer values for each range of severities of meta traps (from 1 to 10) generated. All the counters in the statistics are reset every time the correlator is reset. The correlator statistics may be reset by an SNMP request from the fault summary process 321, or may be reset by the issuance of a signal from another device capable of communicating with the fault correlator 313. The counters 1800 are useful for obtaining statistics about a given correlator. These statistics may be displayed by a user in order to determine the current performance of the network, and the performance of the particular correlator. This information may be used for generating the display window 2200 of FIG. 22.

Figure 19:
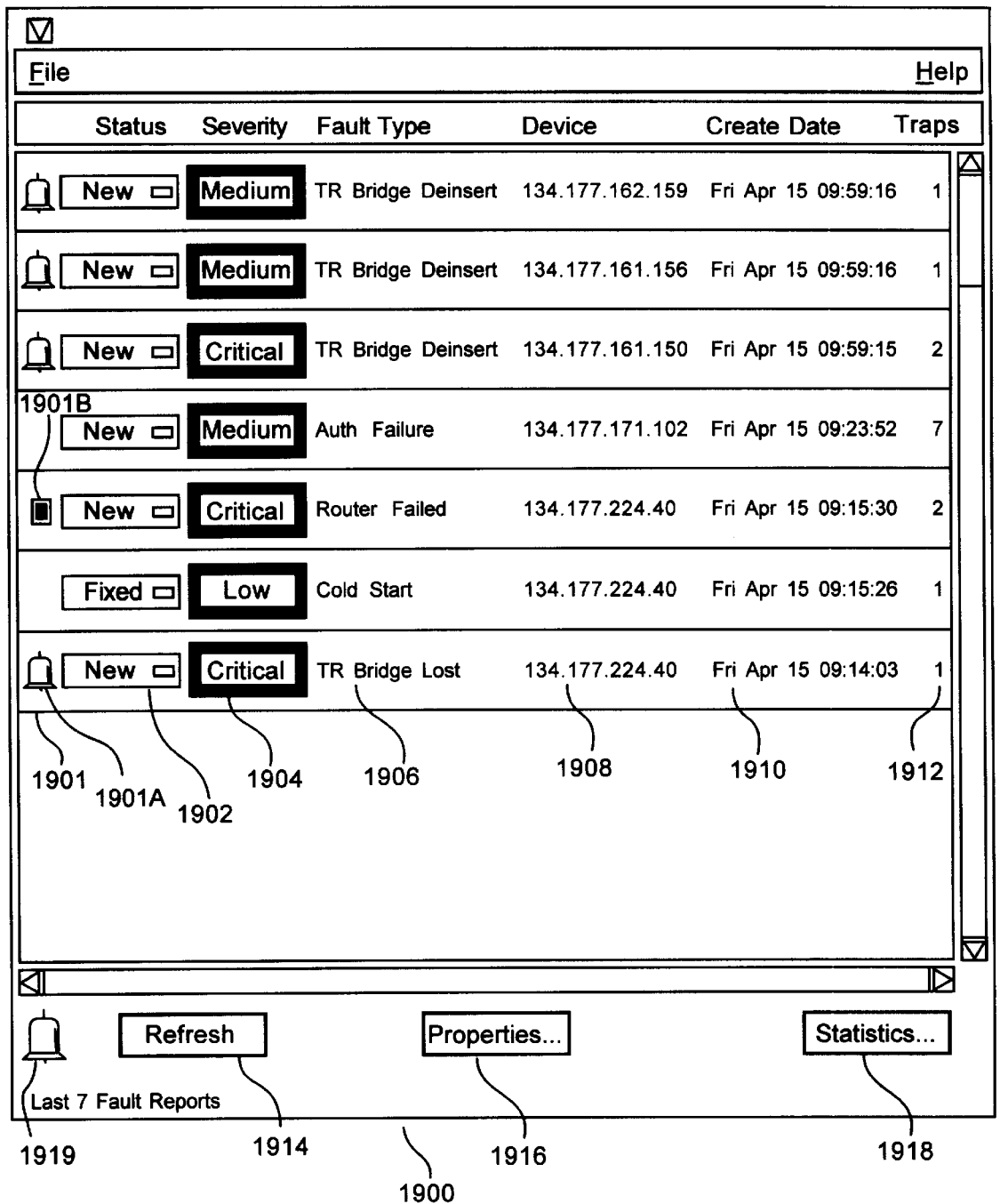
FIG. 19 shows the user interface which may be used for displaying current faults in a networking system.

FIG. 19 illustrates an example user interface display window 1900 which may show to a network manager or other user the current status of faults in the fault data base. For each fault report, certain information may be displayed. For example, for any given fault report generated, the status 1902 of the fault may be displayed. This may be set namely by the user as being "new," "assigned," "fixed," "rejected," or "closed." Although all faults are assigned "new" by default. The severity level is displayed in the field 1904. The type of the fault is displayed in field 1906, and the internet protocol address (or other unique identities) 1908 for the device detecting the trap is displayed. The time in which the initial fault report was created is displayed in field 1910, and the number of trap occurrences that generate the fault are displayed in field 1911. Other options are presented to the user in fields 1914 through 1918. 1914 allows the user to refresh the currently displayed recorded list of fault reports (meta traps). This is done by reading in the faults report data base once again and displaying any new faults which have been generated since the last time the display 1900 was updated. Properties icon 1916 may be selected by the user for specifying the display options of the main window, such as various filtering, summaries, and other information which may be of interest to the network manager or other user. The user may select statistics icon 1918 for retrieving correlation statistics for a particular correlator. Also, the "bell" icon 1919 indicates that there have been new faults since the last refresh of the correlator. Note that various icons upon the display window are color-coded in addition to the text information displayed in order to provide additional information to the user. For example, the severity level ranges from one to ten and different colors may be assigned to each of the severity levels according to implementation and user specification. For example, using the properties control panel to be described below the critical severity level is indicated by a red color, an orange color is used for indicating a medium severity level and yellow indicates a low severity level of the fault. One of two icons is displayed for each fault report at the far self portion 1901 of the display 1900. A separate "bell" icon (e.g., 1901a) is displayed for each new and unreviewed fault report. A "note" icon (e.g., 1901b) is displayed for a fault for which comments have been added by the user.

Figure 20:
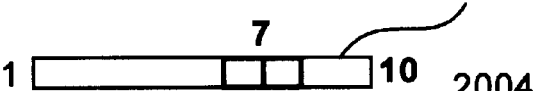
FIG. 20 shows an example of a user interface for specifying the display of faults.

The properties user interface is shown with reference to 2000 of FIG. 20. The user may specify various parameters of the items displayed in window 1900 of FIG. 19. The severity attribute sliders 2002 and 2004 of FIG. 20 may be used for specifying the range of the different severity levels. The use of the sliders has no effect on the rules, but rather, defines the severity levels for the purposes of display. The medium value specified by 2004 must be lower than the critical value specified by slider 2002. The default is one through three for low severity level, four through six for a medium severity level, and seven through ten for a critical severity level. The setting number is used as the floor for each rank.

The filter items 2006 to 2010 are used for filtering out various information which is not of interest to the network manager. For example, the filter by device field 2006 may be used for filtering out any fault reports that are not related to the specified device. The device can be specified by any unique identifier, such as its name or network address. If no device is specified then all reports for all devices are displayed in window 1900 of FIG. 19.

The user may also filter by severity and by status of the faults. Thus, by setting either any of radio buttons 2008 or 2010, various reports may not be displayed to the user in window 2000 according to particular requirements of the manager at the time. The user may also specify a maximum number of fault reports for display on the list. The default for the maximum number is 200, however, the user may adjust this value by selecting slider 2012 and setting it to the appropriate value. Finally, the user may also specify that any reports older than a specified number of days may be deleted from the database as shown in region 2014.

FIG. 21 illustrates a fault detail window which may be displayed upon selection of a specific fault from the fault list 2100 of FIG. 21, and/or the selection of an appropriate pull-down menu on the network management station console. This may be used by the network manager for obtaining a detail of a fault, any probable causes to the fault, and any possible solutions to the fault. This is displayed in 2100 of FIG. 21. For example, in area 2102, the details shown in FIG. 19 are displayed to the user to indicate what the severity level on a problem type, unique identifier, date and time of the faults, correlator, and vendor of the device reporting the fault. This information is obtained from the information stored in meta trap objects such as 1100 of FIG. 11. Then the detailed description of the problem obtained from the defined fault rule (field 1102 of FIG. 11) may be displayed in field 2104 to provide such information to the network manager. Then any probable causes to the fault are displayed in the sub window 2106, any proposed solutions to the problem are displayed in sub window 2108. Field 2110 is used for displaying to the user or network manager and allowing the modification of a particular individual responsible for servicing the fault. If correction of the fault has been assigned to an individual, then this is displayed in field 2110. Field 2112 is a selector icon which is used by the network manager for specifying the current status of the fault. The default is "new" however the manager can select "assigned" "closed" or similar status when he has taken action on the fault in order that he indicate his handling of the particular fault. Field 2114 is used for displaying and/or modifying any free text desired to be associated with the particular fault. This may include special instructions to the user or network manager.

Figure 22:
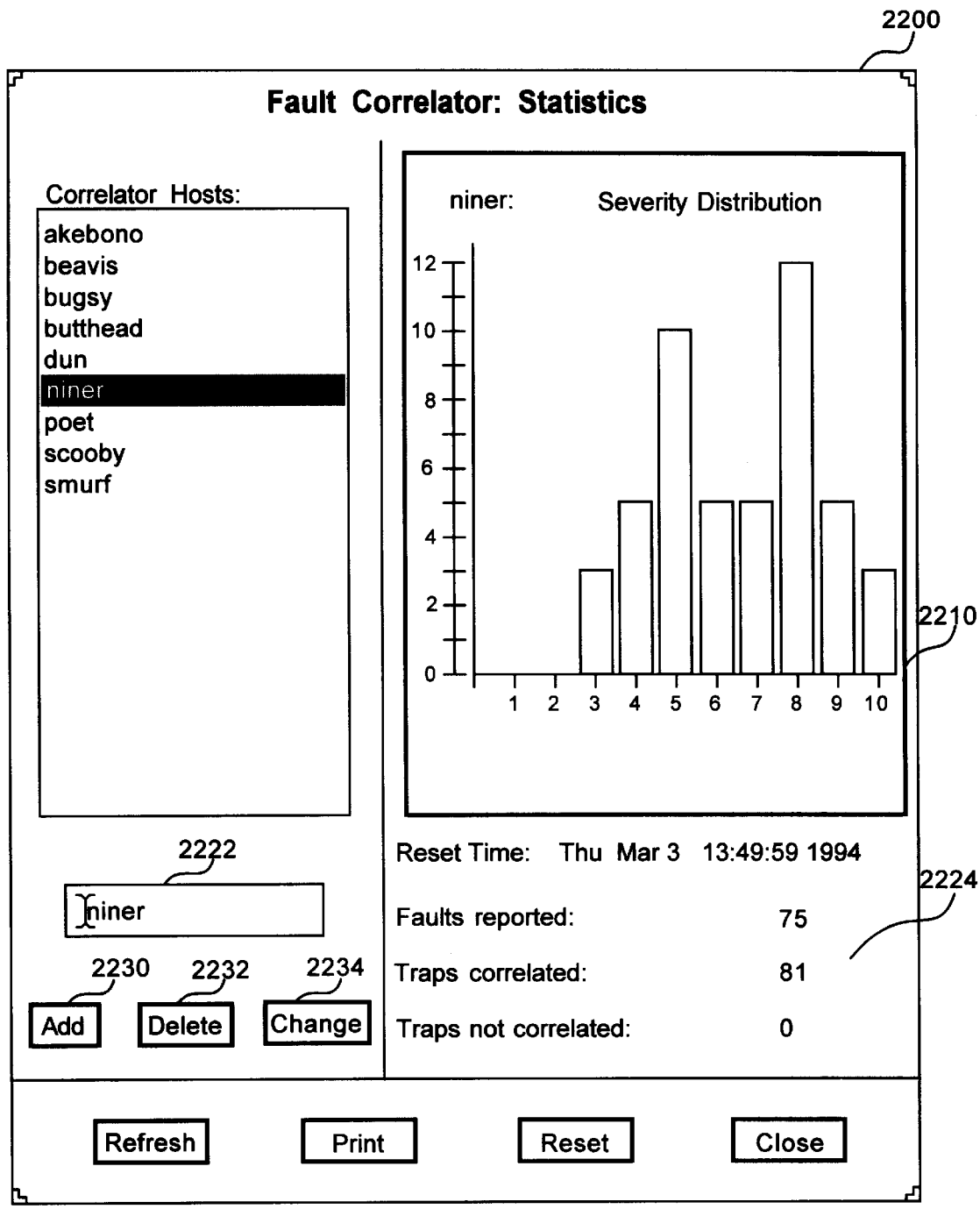
FIG. 22 illustrates a statistics user interface which may be used for displaying the number and distribution of faults for a particular correlator in a networking system.

Window 2200 of FIG. 22 allows the user to select the correlator host for which he wants detailed statistics. The selected correlator host's name is displayed in window 2222, and correlator hosts may be added, deleted, or changed by the user selecting 2230 through 2234, and entering an IP address, name or other unique identifier in field 2222. Detailed statistics are displayed on the right side of the window in areas 2210 and 2224. 2210 is for displaying in graphical form a detail of the distribution of severity levels of the faults currently being displayed. Area 2224 is for displaying the total statistics for the fault correlator hosts currently detected by examining the records (e.g. 1800 of FIG. 18), for each correlator using SNMP requests.

Figure 23:
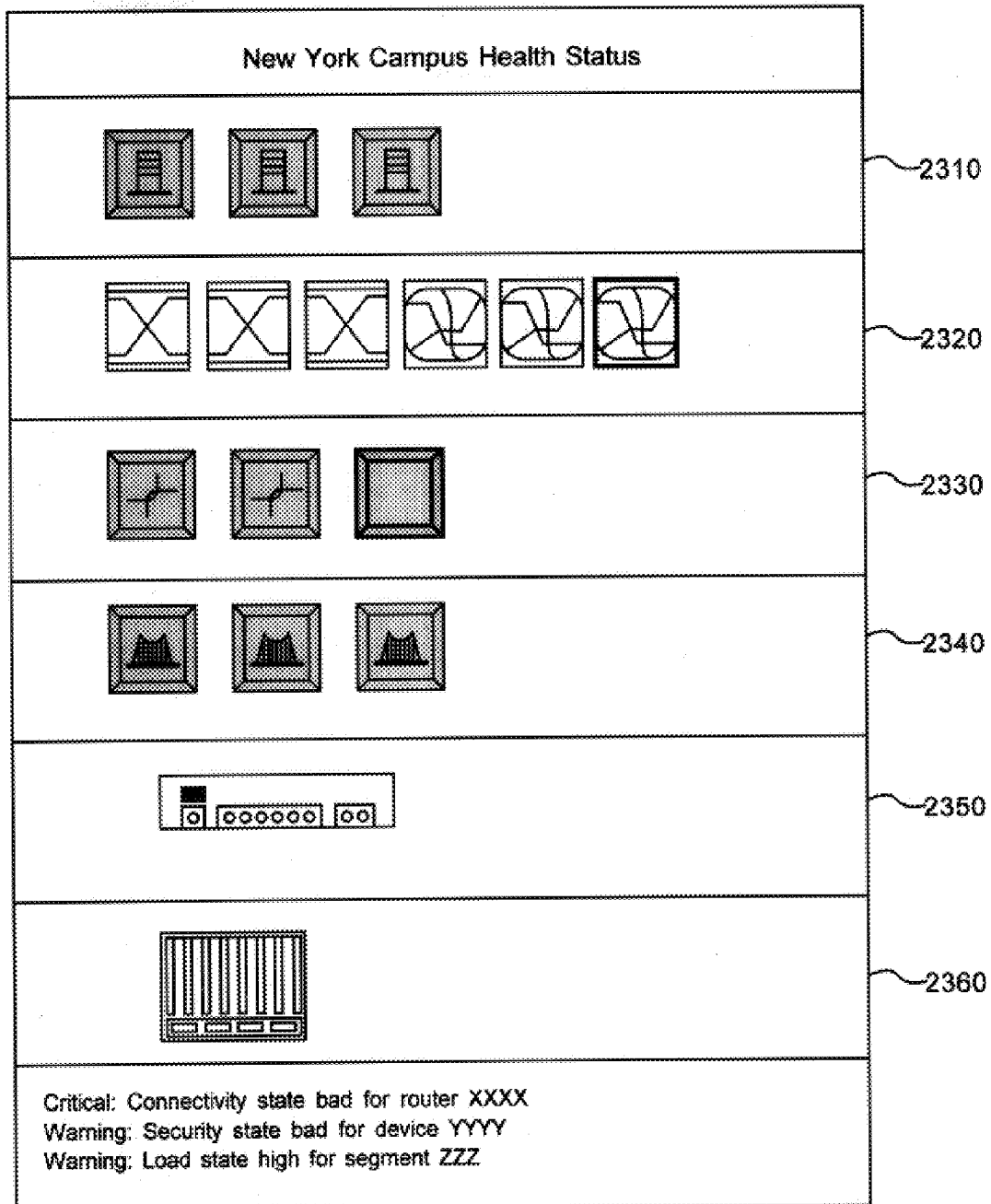
FIG. 23 shows a network health summary user interface for displaying the state of devices in the network.
Figure 24:
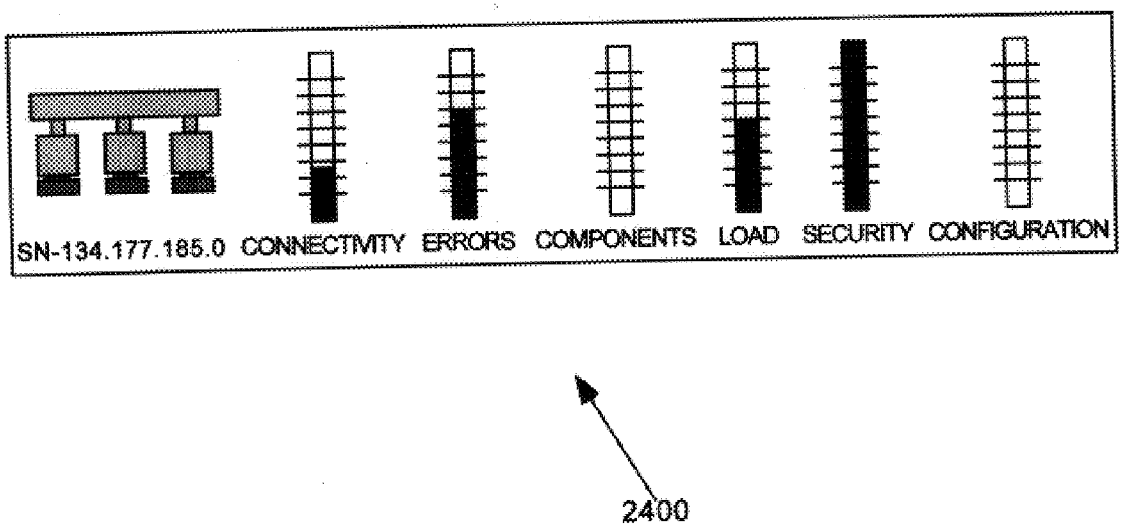
FIG. 24 shows a user interface for displaying the distribution of state changes for a particular network device.

Two example displays which may be displayed by the network management station are shown in FIGS. 23 and 24. As illustrated in FIG. 23, the network health monitor window 2300 may show iconic representation of network devices which are color-coded according to their aggregated state (which is determined based upon the schemes discussed with reference to FIGS. 6–7*b*). The colors which are used may be mapped to the same color codes as discussed with reference to the fault summary windows. Moreover, identifying icons such as the bridge icons, or router icons may be displayed indicating the type of device for which the state summary information is displayed, and is displayed at each level in the networking hierarchy. For example, for the network as a whole, aggregate building health for different physical buildings in which the network is installed may be separately displayed in row 2310. Switches of different types may be displayed with different iconic representations in row 2320. Router health is displayed in row 2330, bridge health is displayed in row 2340, and hub I, hub II health, respectively, according to the particular network's hierarchy, is displayed in rows 2350 and 2360.

Network device identifying information may also be displayed along with the color-coded device. Finally, as discussed with reference to the fault detail summaries above, various filtering of the different state information according to either device or severity level may also be displayed according to user requirements. These are done in a manner well-known to those skilled in the prior user interface arts.

Yet another type of window which may be displayed by the network health monitor is an object state detail which shows a distribution of severity levels of different categories of states for a particular network object. One example of which is shown in 2400 of FIG. 24. Such a window may be accessed by the user selecting one of the devices displayed in display 2300 of FIG. 23. Using a window such as 2400 of FIG. 24, the network manager can then view the current severity levels of each of the different types of state categories for the particular device. In this way, the health of the network may be monitored and the presentation of the information is presented in a most convenient way to the network manager.

Thus, using the foregoing techniques, a plurality of correlators and a networking system may be used to generate detailed fault reports for other devices in the system, which are compiled and then stored into a centralized fault data base for access by a user or a network manager as well as monitoring the current state of the devices. Note that the foregoing has particular advantages in very large networking systems having a large number of stations, devices, or other network resources. Note that the foregoing has particular utility in these systems, and although it has been described with reference to certain specific embodiments in the figures and the text, that one may practice the present invention without utilizing all of these specific details. Thus, the figures and the text are to be viewed an illustrative sense only, and not limit the present invention. The present invention is only to be limited by the appended claims which follow.

What is claimed is:

1. A method of indicating a fault within a network, the method including the computer-implemented steps of:

detecting the occurrence of an event within the network;
   identifying the event as being a first type of event;
   determining whether a threshold number of events identified as being the first type of event have occurred within a first predetermined time period;
   if the threshold number of events have occurred within the first predetermined time period, then indicating a fault within the network;
   detecting the occurrence of a further event within the network after the step of indicating the fault;

identifying the further event as being the first type of event;

determining whether an escalation threshold number of events identified as being the first type of event have occurred within a second predetermined time period and after the step of indicating the fault; and if the escalation threshold number of events have occurred within the second predetermined time period then indicating an escalation in a severity level of the fault.

2. The method of claim 1 wherein the step of indicating the fault comprises generating a fault report incorporating a fault identifier and identifying the severity level of the fault.

3. The method of claim 2 including the step of identifying a cause of the fault and a proposed solution to the fault in the fault report.

4. The method of claim 1 wherein the step of indicating the fault comprises providing a graphical representation of the fault and the severity level of the fault.

5. The method of claim 1 wherein the step of indicating the escalation in the severity level of the fault comprises generating a fault escalation report incorporating an increased severity level of the fault.

6. The method of claim 1 including the step of indicating the total number of events identified as being the first type within an expiration time period.

7. The method of claim 1 including the steps of:

determining whether the event indicates a change in the state of a specific network device; and if the event indicates a change in the state of the specific network device, propagating information regarding the change in the state of the specific network device to a further network device effected by the change in state.

8. The method of claim 1 including the steps of:

in response to the step of identifying the event as being the first type of event, indicating a first network device as being in a first state;

detecting the occurrence of a further event within the network;

determining whether the further event is a second type of event; and indicating the first network device as being in a second state, if the further event is of the second type of event.

9. The method of claim 1 including the step of removing the indication of the fault within the network after a predetermined age period.

10. The method of claim 1 wherein the step of detecting the occurrence comprises the step of receiving a trap from a network device.

11. The method of claim 1 wherein the step of identifying the event comprises the step of determining whether the event occurred at a specific network device.

12. Apparatus for indicating a fault within a network, the apparatus comprising:

an identification circuit to identify a network event as being a first type of event;

a counter to maintain a count of network events identified by the identification circuit as being the first type of event;

a comparator to determine when the count of network events within a first predetermined time period equals or transcends a threshold value; and an indicator to indicate a fault within the network when the count of network events within the first predetermined time period equals or transcends the threshold value;

wherein the counter maintains a count of further network events which occur after the indicator has indicated a fault, and which are identified by the identification circuit as being the first type of event;

wherein the comparator determines when the count of further network events, within a second predetermined time period, equals or transcends an escalation threshold value; and wherein the indicator indicates an escalation fault identifying an increased severity level of the fault when the count of further network events, within the second predetermined time period, equals or transcends the escalation threshold value.

13. The apparatus of claim 12 including a detection circuit to detect the occurrence of a network event.

14. The apparatus of claim 12 wherein the indicator comprises a report generator which generates a fault report incorporating a fault identifier and identifying the severity level of the fault.

15. The apparatus of claim 14 wherein the report generator identifies a cause of the fault and a proposed solution to the fault in the fault report.

16. The apparatus of claim 12 wherein the indicator indicates the total number events identified as being of the first type within an expiration time period.

17. The apparatus of claim 12 including a state change circuit that determines whether the network event indicates a change in the state of a specific network device, and that propagates information regarding the change in the state of the specific network device to a further network device effected by the change in the state.

18. A method of indicating a fault within a network, the method including the computer-implemented steps of:

detecting the occurrence of an event within the network;

identifying the event as being a first type of event;

determining whether a threshold number of events identified as being the first type of event have occurred within a predetermined time period;

if the threshold number of events have occurred within the predetermined time period, then indicating a fault within the network;

in response to the step of identifying the event as being the first type of event, indicating a first network device as being in a first state;

detecting the occurrence of a further event within the network;

determining whether the further event is a second type of event; and indicating the first network device as being in a second state, if the further event is of the second type of event.

19. An apparatus for indicating a fault within a network, the apparatus comprising:

an identification circuit to identify a network event as being a first type of event;

a counter to maintain a count of network events identified by the identification circuit as being the first type of event;

a comparator to determine when the count of network events within a predetermined time period equals or transcends a threshold value; and an indicator to indicate a fault within the network when the count of network events within the predetermined time period equals or transcends the threshold value;

wherein the indicator indicates a first network device as being in a first state when the network event is identified as being the first type of event;

wherein the identification circuit identifies a further event within the network as being a second type of event; and wherein the indicator indicates the first network device as being in a second state, if the further event is identified as being the second type of event.

* * * * *